US012783101B2

(12) United States Patent
Shi et al.

(10) Patent No.: US 12,783,101 B2
(45) Date of Patent: Nov. 3, 2026

(54) APPLICATION CLONE-BASED INTERFACE DISPLAY METHOD AND RELATED APPARATUS

(71) Applicant: Honor Device Co., Ltd., Shenzhen (CN)

(72) Inventors: Ke Shi, Shenzhen (CN); Dezhi Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 264 days.

(21) Appl. No.: 18/833,146

(22) PCT Filed: Sep. 4, 2023

(86) PCT No.: PCT/CN2023/116855

§ 371 (c)(1),
(2) Date: Jul. 25, 2024

(87) PCT Pub. No.: WO2024/055867

PCT Pub. Date: Mar. 21, 2024

(65) Prior Publication Data

US 2025/0103177 A1 Mar. 27, 2025

(30) Foreign Application Priority Data

Sep. 15, 2022 (CN) ......................... 202211123072.6

(51) Int. Cl.
*G06F 3/04817* (2022.01)
*G06F 9/451* (2018.01)

(52) U.S. Cl.
CPC .......... *G06F 3/04817* (2013.01); *G06F 9/451* (2018.02)

(58) Field of Classification Search
CPC .... G06F 3/04817; G06F 9/451; G06F 3/0482; G06F 3/04842; G06F 3/04847; G06F 3/0488; G06Q 20/3267
See application file for complete search history.

(56) References Cited

U.S. PATENT DOCUMENTS

2017/0160883 A1* 6/2017 Yuan ....................... G06F 9/453
2024/0244017 A1 7/2024 Wang et al.

FOREIGN PATENT DOCUMENTS

CN 107066863 A 8/2017
CN 109117208 A 1/2019

(Continued)

*Primary Examiner* — Phuong H Nguyen
(74) *Attorney, Agent, or Firm* — Slater Matsil, LLP

(57) ABSTRACT

Embodiments of this application provide an application clone-based interface display method and a related apparatus. The method includes: A terminal device displays a first interface at a first moment, where the first interface includes first content of a first application clone, an icon of a second application, and an icon of a second application clone; the terminal device receives a first operation for the icon of the second application clone; the terminal device displays a second interface, where the second interface includes a first control, and the second interface is an interface of the second application clone; the terminal device receives a second operation for the first control at a second moment; and the terminal device displays a third interface, where the third interface is an interface of the first application clone, a time interval between the second moment and the first moment is less than first preset duration.

16 Claims, 36 Drawing Sheets

(56) References Cited

FOREIGN PATENT DOCUMENTS

| | | | |
|---|---|---|---|
| CN | 109118448 | A | 1/2019 |
| CN | 106484482 | B | 12/2019 |
| CN | 112464208 | A | 3/2021 |
| WO | 2017177556 | A1 | 10/2017 |
| WO | 2017193462 | A1 | 11/2017 |
| WO | 2022052706 | A1 | 3/2022 |

* cited by examiner

CONT. FROM FIG. 3A

TO FIG. 4B

CONT. FROM FIG. 4G

CONT. FROM FIG. 4D

CONT. FROM FIG. 4F

CONT. FROM FIG. 5B

TO FIG. 5D Generate a record of sharing content from the clone of application A to a clone of application B, and set effective duration of the record

CONT. FROM FIG. 5C

TO FIG. 5E

CONT. FROM FIG. 6B

CONT. FROM FIG. 7A

TO FIG. 7C

CONT. FROM FIG. 7B

TO FIG. 7D

CONT. FROM FIG. 7C

Generate a record of sharing content from a clone of application A to a clone of application B, and set effective duration of the record

TO FIG. 7E

CONT. FROM FIG. 8A

TO FIG. 8C

A time interval between the moment and a moment when a record is generated is less than or equal to effective duration

CONT. FROM FIG. 8B

APPLICATION CLONE-BASED INTERFACE DISPLAY METHOD AND RELATED APPARATUS

CROSS-REFERENCE TO RELATED APPLICATIONS

This application is a national stage of International Application No. PCT/CN2023/116855, filed on Sep. 4, 2023, which claims priority to Chinese Patent Application No. 202211123072.6, filed on Sep. 15, 2022, both of which are incorporated herein by reference in their entireties.

TECHNICAL FIELD

This application relates to the field of terminal technologies, and in particular, to an application clone-based interface display method and a related apparatus.

BACKGROUND

Some terminal devices may support an application clone function. The application clone function allows a home screen of a terminal device to display an application and one or more clone applications of the application. The application and the clone applications of the application can run independently. For example, the application and the clone applications of the application may respectively support login of different accounts, to meet a requirement of allowing for simultaneous login of a plurality of accounts on a same terminal device.

In some implementations, when two applications with clone applications share content, a user needs to select between respective applications and clones of the two applications. For example, if application 1 has clone application 1 and application 2 has clone application 2, when the user wants to share content in application 1 to application 2, the user needs to select an icon of application 2 in an interface that includes the icon of application 2 and an icon of clone application 2 to share the content to application 2. In addition, when content sharing is completed and returning to the application 1 is performed, the user needs to select an icon of application 1 in an interface that includes the icon of application 1 and an icon of clone application 1 to return to application 1.

However, in the foregoing interface display process, the user needs to perform a plurality of operations, so that the process is cumbersome, and user experience is poor.

SUMMARY

Embodiments of this application provide an application clone-based interface display method and related apparatus. An operation process of jumping between interfaces of application clones is simplified to save user's time, so that user experience is improved.

According to a first aspect, an embodiment of this application provides an application clone-based interface display method. The method includes:

A terminal device displays a first interface at a first moment, where the first interface includes first content of a first application clone, an icon of a second application, and an icon of a second application clone; the terminal device receives a first operation for the icon of the second application clone; the terminal device displays a second interface based on the first operation, where the second interface includes a first control, and the second interface is an interface of the second application clone; the terminal device receives a second operation for the first control at a second moment; and the terminal device displays a third interface in response to the second operation, where the third interface is an interface of the first application clone, the second moment is later than the first moment, and a time interval between the second moment and the first moment is less than or equal to first preset duration.

For example, the first interface may be an interface shown in FIG. 5C. The second interface may be an interface shown in FIG. 5F. The first control is a control 410 for returning to application A. The third interface may be an interface shown in FIG. 5A. Alternatively, the first interface may be an interface shown in FIG. 7C. The second interface may be an interface shown in FIG. 7E. The first control is a control 504 for returning to application D. The third interface may be an interface shown in FIG. 7A.

In this way, when the time interval between the second moment and the first moment is less than or equal to the first preset duration, the terminal device may perform jumping from the interface of the second application clone to the interface of the first application clone in response to the second operation for the first control. An operation process of returning from the second application clone to the first application clone is simplified to save user's time, so that user experience is improved.

In a possible implementation, that the terminal device displays a third interface in response to the second operation includes:

The terminal device determines, in response to the second operation, whether the time interval between the second moment and the first moment is less than or equal to the first preset duration; and the terminal device displays the third interface when the terminal device determines that the time interval between the second moment and the first moment is less than or equal to the first preset duration. In this way, when the time interval is less than the first preset duration, the terminal device displays the third interface in response to the second operation, so that the displayed third interface is consistent with a user intention and user experience is further improved.

In a possible implementation, when the terminal device displays the second interface, the method further includes: The terminal device generates a first record of jumping from the first application clone to the second application clone, where effective duration of the first record is the first preset duration; and that the terminal device determines whether the time interval between the second moment and the first moment is less than or equal to the first preset duration includes: The terminal device determines whether the first record is valid, where when the first record is valid, the terminal device determines that the time interval between the second moment and the first moment is less than or equal to the first preset duration. In this way, based on the duration, it is determined that the first record is valid, to improve accuracy of determining that the first record is valid, so that the terminal device accurately displays the third interface based on the valid first record.

In a possible implementation, the first content of the first application clone is multimedia information; and that the terminal device displays a second interface based on the first operation includes: The terminal device displays a fourth interface in response to the first operation, where the fourth interface includes an icon of a first chat window; the terminal device receives a third operation for the icon of the first chat window; the terminal device displays a fifth interface in response to the third operation, where the fifth interface includes a control to confirm sharing; the terminal device receives a fourth operation for the control to confirm sharing; and the terminal device shares the multimedia information to the first chat window, and displays the second interface, in response to the fourth operation, where the second interface includes first prompt information for prompting successful sharing of the multimedia information.

For example, the fourth interface may be an interface shown in FIG. 5D. The fifth interface may be an interface shown in FIG. 5E.

In this way, the terminal device is enabled to share content of the first application clone to the first chat window. The first chat window may be selected freely by a user, so that user experience is improved.

In a possible implementation, the first content of the first application clone is payment information; and that the terminal device displays a second interface based on the first operation includes: The terminal device shares the payment information to the second application clone, and displays a sixth interface, in response to the first operation, where the sixth interface includes a payment control; the terminal device receives a fifth operation for the payment control; and the terminal device displays the second interface in response to the fifth operation, where the second interface includes second prompt information for prompting successful payment.

For example, the sixth interface may be an interface shown in FIG. 7D. The second interface may be an interface shown in FIG. 7E.

In this way, the second application clone may be started by using the first application clone, and payment is completed in the second application clone, to provide convenience for a payment process of the user and improve user experience.

In a possible implementation, the method further includes: The terminal device displays a seventh interface at a third moment, where the seventh interface includes second content of the first application clone, the icon of the second application, and the icon of the second application clone; the terminal device receives a sixth operation for the icon of the second application clone; the terminal device displays an eighth interface based on the sixth operation, where the eighth interface includes a second control, and the eighth interface is the interface of the second application clone; the terminal device receives a seventh operation for the second control at a fourth moment; the terminal device displays a ninth interface in response to the seventh operation, where the ninth interface includes an icon of a first application and an icon of the first application clone, the fourth moment is later than the third moment, and a time interval between the fourth moment and the third moment is greater than the first preset duration; the terminal device receives an eighth operation for the icon of the first application clone; and the terminal device displays a tenth interface in response to the eighth operation, where the tenth interface is the interface of the first application clone.

For example, the seventh interface may be an interface shown in FIG. 5C. The eighth interface may be an interface shown in FIG. 5F. The second control is a control 410 for returning to application A. The ninth interface may be an interface shown in FIG. 4G. The tenth interface may be an interface shown in FIG. 5A. The seventh interface may alternatively be an interface shown in FIG. 7C. The eighth interface may alternatively be an interface shown in FIG. 7E. The second control is a control 504 for returning to application D. The tenth interface may alternatively be an interface shown in FIG. 7A.

In this way, when the time interval between the fourth moment and the third moment is greater than the first preset duration, the user may freely select whether the terminal device displays an interface of the first application or the interface of the first application clone, to further improve user experience.

In a possible implementation, that the terminal device displays a ninth interface in response to the seventh operation includes: The terminal device determines, in response to the seventh operation, whether the time interval between the fourth moment and the third moment is greater than the first preset duration; and the terminal device displays the ninth interface when the terminal device determines that the time interval between the fourth moment and the third moment is greater than the first preset duration. In this way, when the time interval exceeds the first preset duration, the terminal device displays the ninth interface in response to the seventh operation, so that the displayed ninth interface is consistent with a user intention and user experience is improved.

In a possible implementation, when the terminal device displays the eighth interface, the method further includes: The terminal device generates a second record of jumping from the first application clone to the second application clone, where effective duration of the second record is the first preset duration; and that the terminal device determines whether the time interval between the fourth moment and the third moment is greater than the first preset duration includes: The terminal device determines whether the second record is valid, where when the second record is invalid, the terminal device determines that the time interval between the fourth moment and the third moment is greater than the first preset duration. In this way, based on the duration, it is determined that the first record is invalid, to improve accuracy of determining that the record is invalid, so that the terminal device accurately displays the ninth interface based on the invalid first record.

In a possible implementation, after the third moment, the method further includes: The terminal device displays an eleventh interface at a fifth moment, where the eleventh interface includes third content of the first application clone and the icon of the second application, and a time interval between the fifth moment and the third moment is less than or equal to second preset duration; the terminal device receives a ninth operation for the icon of the second application; and the terminal device displays a twelfth interface in response to the ninth operation, where the twelfth interface is the interface of the second application clone.

For example, the eleventh interface may be an interface shown in FIG. 6B. The twelfth interface may be an interface shown in FIG. 6C. The eleventh interface may alternatively be an interface shown in FIG. 8B. The twelfth interface may alternatively be an interface shown in in FIG. 8C.

In this way, when the time interval between the fifth moment and the third moment is less than or equal to the second preset duration, the terminal device may perform jumping from the interface of the first application clone to the interface of the second application clone in response to the ninth operation for the icon of the second application. A user operation process of jumping from the first application clone to the second application clone is simplified to save user's time, so that user experience is improved.

In a possible implementation, that the terminal device displays a twelfth interface in response to the ninth operation includes: The terminal device determines, in response to the ninth operation, whether the time interval between the fifth moment and the third moment is less than or equal to the second preset duration; and the terminal device displays the twelfth interface when the terminal device determines that the time interval between the fifth moment and the third moment is less than or equal to the second preset duration. In this way, within the second preset duration, the terminal device displays the twelfth interface in response to the ninth operation, so that the displayed twelfth interface is consistent with a user intention and user experience is further improved.

In a possible implementation, effective duration of the second record of jumping from the first application clone to the second application clone is the second preset duration; and that the terminal device determines whether the time interval between the fifth moment and the third moment is less than or equal to the second preset duration includes: The terminal device determines whether the second record is valid, where when the second record is valid, the terminal device determines that the time interval between the fifth moment and the third moment is less than or equal to the second preset duration. In this way, based on the duration, it is determined that the second record is valid, to improve accuracy of determining that the second record is valid, so that the terminal device accurately displays the twelfth interface based on the valid second record.

In a possible implementation, after the third moment, the method further includes: The terminal device displays a thirteenth interface at a sixth moment, where the thirteenth interface includes fourth content of the first application clone and the icon of the second application, and a time interval between the sixth moment and the third moment is greater than second preset duration; the terminal device receives a tenth operation for the icon of the second application clone; and the terminal device displays a fourteenth interface in response to the tenth operation, where the fourteenth interface includes the fourth content of the first application clone, the icon of the second application, and the icon of the second application clone.

For example, the thirteenth interface may be an interface shown in FIG. 6B. The fourteenth interface may be an interface shown in FIG. 4G. The thirteenth interface may alternatively be an interface shown in FIG. 8B.

In this way, when the time interval between the sixth moment and the third moment is greater than the second preset duration, the user may freely select whether the terminal device displays an interface of the second application or the interface of the second application clone, to further improve user experience.

In a possible implementation, that the terminal device displays a fourteenth interface in response to the tenth operation includes: The terminal device determines, in response to the tenth operation, whether a time interval between the sixth moment and the third moment is greater than the second preset duration; and the terminal device displays the fourteenth interface when the terminal device determines that the time interval between the sixth moment and the third moment is greater than the second preset duration. In this way, when the time interval exceeds the second preset duration, the terminal device displays the fourteenth interface in response to the tenth operation, so that the displayed fourteenth interface is consistent with a user intention and user experience is improved.

In a possible implementation, effective duration of the second record of jumping from the first application clone to the second application clone is the second preset duration; and that the terminal device determines whether the time interval between the sixth moment and the third moment is greater than the second preset duration includes: The terminal device determines whether the second record is valid, where when the second record is invalid, the terminal device determines that the time interval between the sixth moment and the third moment is greater than the second preset duration. In this way, based on the duration, it is determined that the second record is invalid, to improve accuracy of determining that the second record is invalid, so that the terminal device accurately displays the fourteenth interface based on the invalid second record.

According to a second aspect, an embodiment of this application provides an application clone-based interface display apparatus, where the application clone-based interface display apparatus may be a terminal device, or may be a chip or a chip system in the terminal device. The application clone-based interface display apparatus may include a processing unit and a display unit. The processing unit is configured to implement any method related to processing according to any one of the first aspect and the possible implementations of the first aspect. The display unit may be a display screen, or the like. The display unit may implement, based on control of the processing unit, any step related display according to any one of the first aspect and the possible implementations of the first aspect. When the application clone-based interface display apparatus is a terminal device, the processing unit may be a processor. The application clone-based interface display apparatus may further include a storage unit, and the storage unit may be a memory. The storage unit is configured to store instructions, and the processing unit executes the instructions stored in the storage unit, to enable the terminal device to implement a method according to any one of the first aspect and the possible implementations of the first aspect. When the application clone-based interface display apparatus is a chip or a chip system in the terminal device, the processing unit may be a processor. The processing unit executes the instructions stored in the storage unit, to enable the terminal device to implement a method according to any one of the first aspect and the possible implementations of the first aspect. The storage unit may be a storage unit (for example, a register or a cache) in the chip, or may be a storage unit (for example, a read-only memory or a random access memory) located outside the chip in the terminal device.

For example, the display unit is configured to display a first interface at a first moment. The first interface includes first content of a first application clone, an icon of a second application, and an icon of a second application clone.

The processing unit is configured to receive a first operation for the icon of the second application clone.

The display unit is further configured to enable the terminal device to display a second interface based on the first operation, the second interface includes a first control, and the second interface is an interface of the second application clone.

The processing unit is further configured to receive a second operation for the first control at a second moment.

The display unit is further configured to display a third interface in response to the second operation, the third interface is an interface of the first application clone, the second moment is later than the first moment, and a time interval between the second moment and the first moment is less than or equal to first preset duration.

In a possible implementation, the processing unit is specifically configured to determine, in response to the second operation, whether the time interval between the second moment and the first moment is less than or equal to the first preset duration; and the terminal device displays the third interface when the terminal device determines that the time interval between the second moment and the first moment is less than or equal to the first preset duration.

In a possible implementation, the processing unit is further configured to generate a first record of jumping from the first application clone to the second application clone. Effective duration of the first record is the first preset duration.

The processing unit is further configured to determine whether the first record is valid; and when the first record is valid, the terminal device determines that the time interval between the second moment and the first moment is less than or equal to the first preset duration.

In a possible implementation, the display unit is further configured to enable the terminal device to display a fourth interface in response to the first operation. The fourth interface includes an icon of a first chat window.

The processing unit is further configured to receive a third operation for the icon of the first chat window.

The display unit is further configured to display a fifth interface in response to the third operation. The fifth interface includes a control to confirm sharing.

The processing unit is further configured to receive a fourth operation for the control to confirm sharing.

The processing unit is further configured to share multimedia information to the first chat window, and display the second interface, in response to the fourth operation. The second interface includes first prompt information for prompting successful sharing of the multimedia information.

In a possible implementation, the processing unit is further configured to share payment information to the second application clone, and display a sixth interface, in response to the first operation. The sixth interface includes a payment control.

The processing unit is further configured to receive a fifth operation for the payment control.

The display unit is further configured to display the second interface in response to the fifth operation. The second interface includes second prompt information for prompting successful payment.

In a possible implementation, the display unit is further configured to display a seventh interface at a third moment. The seventh interface includes second content of the first application clone, the icon of the second application, and the icon of the second application clone.

The processing unit is further configured to receive a sixth operation for the icon of the second application clone.

The display unit is further configured to display an eighth interface based on the sixth operation, the eighth interface includes a second control, and the eighth interface is the interface of the second application clone.

The processing unit is further configured to receive a seventh operation for the second control at a fourth moment.

The display unit is further configured to display a ninth interface in response to the seventh operation. The ninth interface includes an icon of a first application and an icon of the first application clone; and the fourth moment is later than the third moment, and a time interval between the fourth moment and the third moment is greater than the first preset duration.

The processing unit is further configured to enable the terminal device to receive an eighth operation for the icon of the first application clone.

The display unit is further configured to enable the terminal device to display a tenth interface in response to the eighth operation. The tenth interface is the interface of the first application clone.

In a possible implementation, the processing unit is further configured to determine, in response to the seventh operation, whether the time interval between the fourth moment and the third moment is greater than the first preset duration; and the terminal device displays the ninth interface when the terminal device determines that the time interval between the fourth moment and the third moment is greater than the first preset duration.

In a possible implementation, the processing unit is further configured to generate a second record of jumping from the first application clone to the second application clone. Effective duration of the second record is the first preset duration.

The processing unit is specifically configured to determine whether the second record is valid; and when the second record is invalid, the terminal device determines that the time interval between the fourth moment and the third moment is greater than the first preset duration.

In a possible implementation, the display unit is further configured to display an eleventh interface at a fifth moment. The eleventh interface includes third content of the first application clone and the icon of the second application; and a time interval between the fifth moment and the third moment is less than or equal to second preset duration.

The processing unit is further configured to enable the terminal device to receive a ninth operation for the icon of the second application.

The display unit is further configured to display a twelfth interface in response to the ninth operation. The twelfth interface is the interface of the second application clone.

In a possible implementation, the processing unit is further configured to determine, in response to the ninth operation, whether the time interval between the fifth moment and the third moment is less than or equal to the second preset duration; and the terminal device displays the twelfth interface when the terminal device determines that the time interval between the fifth moment and the third moment is less than or equal to the second preset duration.

In a possible implementation, the processing unit is further configured to generate the second record of jumping from the first application clone to the second application clone. Effective duration of the second record is the second preset duration.

The processing unit is specifically configured to determine whether the second record is valid; and when the second record is valid, the terminal device determines that the time interval between the fifth moment and the third moment is less than or equal to the second preset duration.

In a possible implementation, the display unit is further configured to enable the terminal device to display a thirteenth interface at a sixth moment. The thirteenth interface includes fourth content of the first application clone and the icon of the second application; and a time interval between the sixth moment and the third moment is greater than second preset duration.

The processing unit is further configured to receive a tenth operation for the icon of the second application clone.

The display unit is further configured to enable the terminal device to display a fourteenth interface in response to the tenth operation; and the fourteenth interface includes the fourth content of the first application clone, the icon of the second application, and the icon of the second application clone.

In a possible implementation, the processing unit is further configured to determine, in response to the tenth operation, whether the time interval between the sixth moment and the third moment is greater than the second preset duration; and the terminal device displays the fourteenth interface when the terminal device determines that the time interval between the sixth moment and the third moment is greater than the second preset duration.

In a possible implementation, the processing unit is specifically configured to determine whether the second record is valid; and when the second record is invalid, the terminal device determines that the time interval between the sixth moment and the third moment is greater than the second preset duration.

According to a third aspect, an embodiment of this application provides an electronic device, including a processor and a memory. The memory is configured to store code instructions, and the processor is configured to run the code instructions, to perform the method according to any one of the first aspect and the possible implementations of the first aspect.

According to a fourth aspect, an embodiment of this application provides a computer-readable storage medium. The computer-readable storage medium has a computer program or instructions stored thereon, and when the computer program or the instructions run on a computer, the computer is enabled to perform the method according to any one of the first aspect and the possible implementations of the first aspect.

According to a fifth aspect, an embodiment of this application provides a computer program product including a computer program. When the computer program runs on a computer, the computer is enabled to perform the method according to any one of the first aspect and the possible implementations of the first aspect.

According to a sixth aspect, this application provides a chip or a chip system. The chip or the chip system includes at least one processor and a communication interface. The communication interface and the at least one processor are interconnected via a wire. The at least one processor is configured to execute a computer program or instructions to perform the method according to any one of the first aspect and the possible implementations of the first aspect. The communication interface in the chip may be an input/output interface, a pin, a circuit, or the like.

In a possible implementation, the chip or the chip system according to this application further includes at least one memory. The at least one memory has instructions stored therein. The memory may be a storage unit, for example, a register or a cache, inside the chip, or may be a storage unit (for example, a read-only memory or a random access memory) of the chip.

It should be understood that technical solutions of the second aspect to the sixth aspect of this application correspond to the technical solutions of the first aspect of this application, and beneficial effects achieved in the aspects and corresponding feasible implementations are similar. Details are not described.

DETAILED DESCRIPTION OF ILLUSTRATIVE EMBODIMENTS

To describe the technical solutions in embodiments of this application more clearly, the following briefly describes some terms and technologies used in embodiments of this application.

1. Application clone function: A clone function of an application can be enabled when a user of a terminal device is an owner user. When the application clone function is enabled, an application and one or more clone applications of the application may be displayed on a home screen of the terminal device, and the application and application clones may run independently.

For example, the user may open or close the application clone function of the application in settings of the terminal device. FIG. 1 is a schematic diagram of an interface for enabling an application clone function. In an embodiment corresponding to FIG. 1, an example in which the terminal device is a mobile phone is used for descriptions, and this example does not constitute a limitation on this embodiment of this application.

Figure 1A:
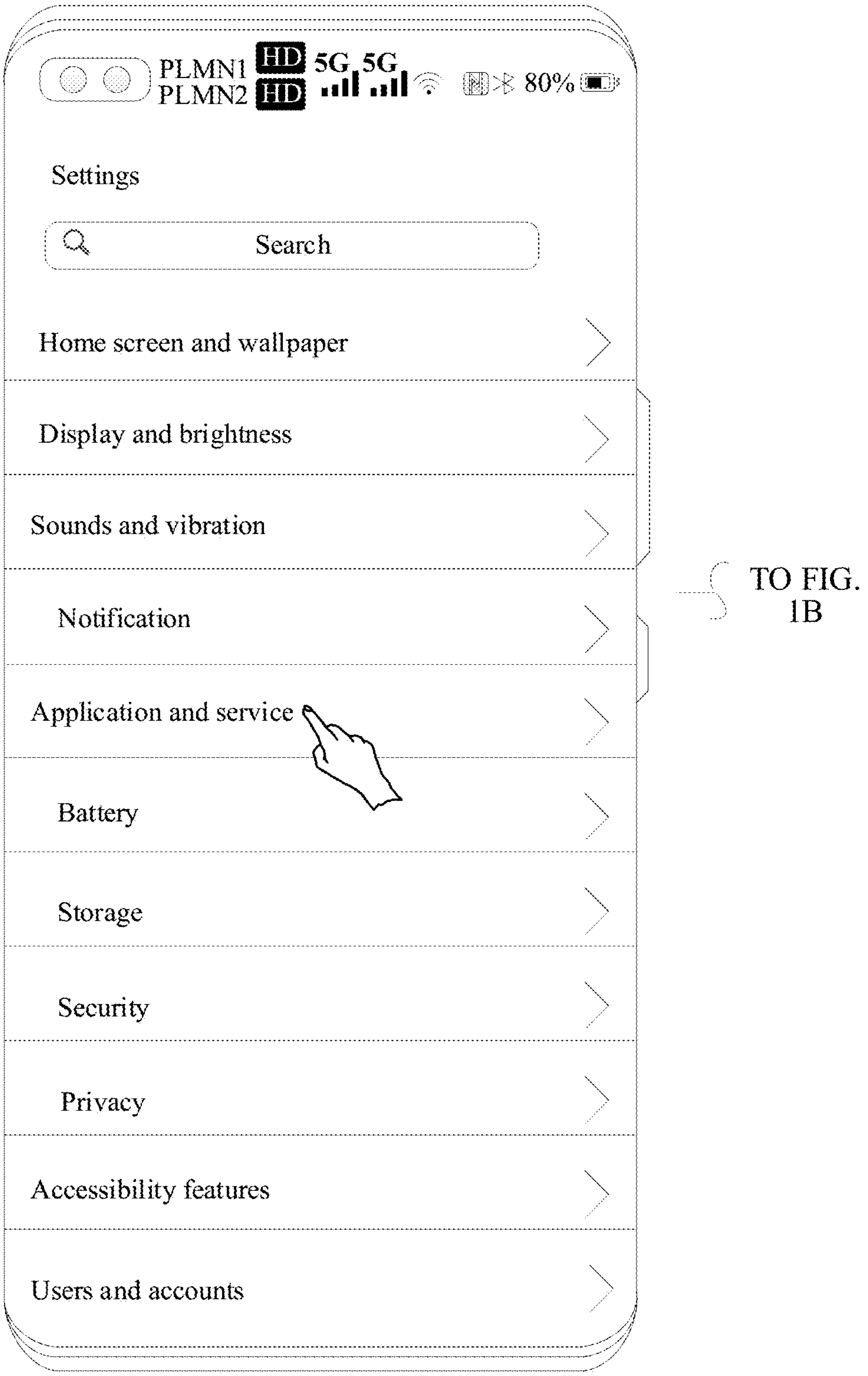
FIG. 1 is a schematic diagram of an interface for enabling an application clone function according to an embodiment of this application.

The interface as shown in FIG. 1A is a setting interface of the terminal device. For example, the interface as shown in FIG. 1A may include a home screen and wallpaper control, a display and brightness control, a sound and vibration control, a notification control application and service control, a battery control, a storage control, a security control, a privacy control, an accessibility feature control, and a user and account control. The setting interface of the terminal device may further include another setting option control (not shown in FIG. 1A). The user may flick on the interface as shown in FIG. 1A to display another setting option control.

Figure 1B:
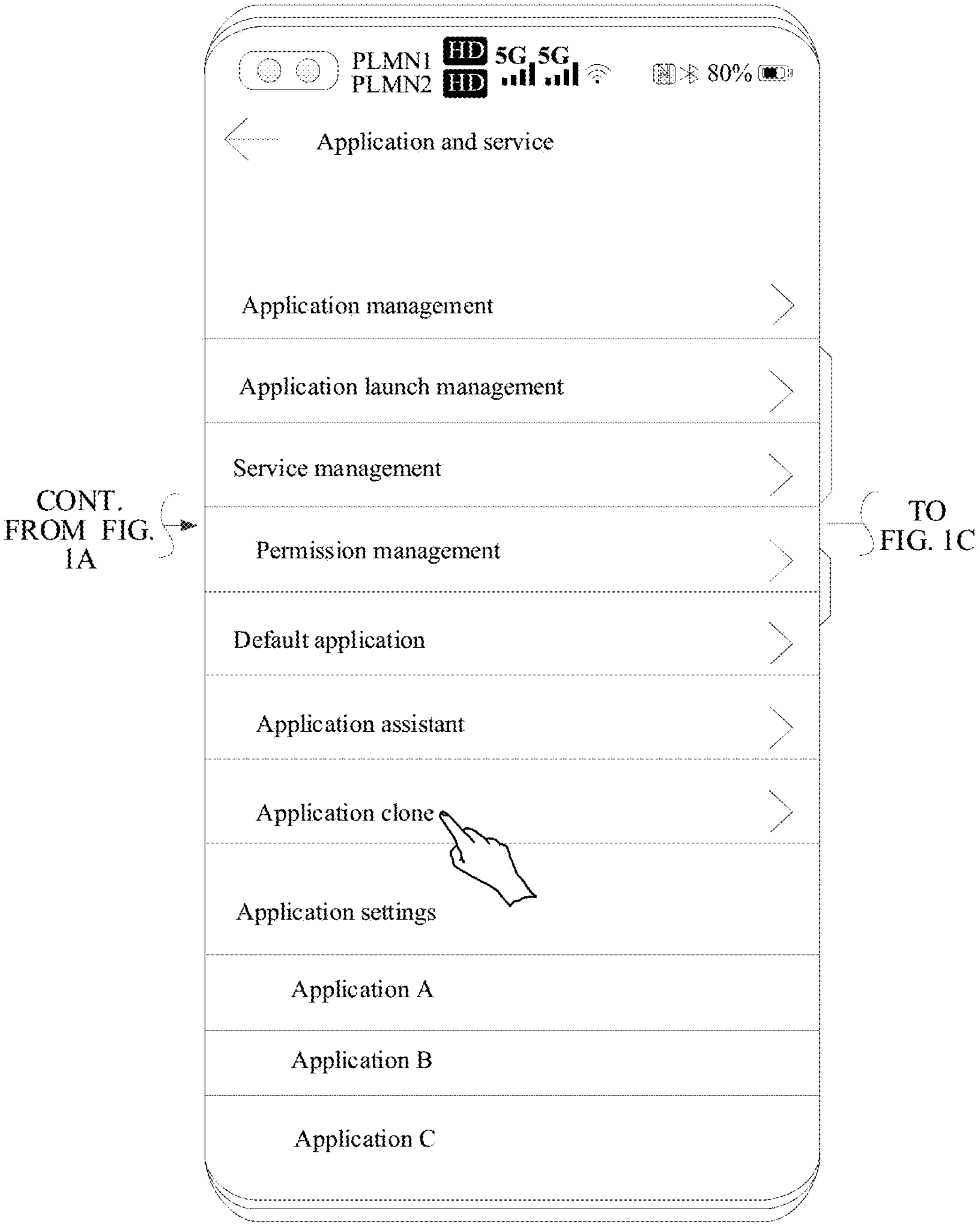

For example, in the interface as shown in FIG. 1A, the terminal device may receive a tap operation of the user for the application and service control, and in response to the operation, may display an interface as shown in FIG. 1B. The interface may include application management control, an application launch management control, a service management control, a permission management control, an application assistant control, and a control of application A, a control of application B, and a control of application C in application settings. Application A, application B, and application C are all applications installed in the terminal device. The interface may further include a control (not shown in FIG. 1B) of another application installed in the terminal device. The user may flick on the interface as shown in FIG. 1B to display another application control.

Figure 1C:
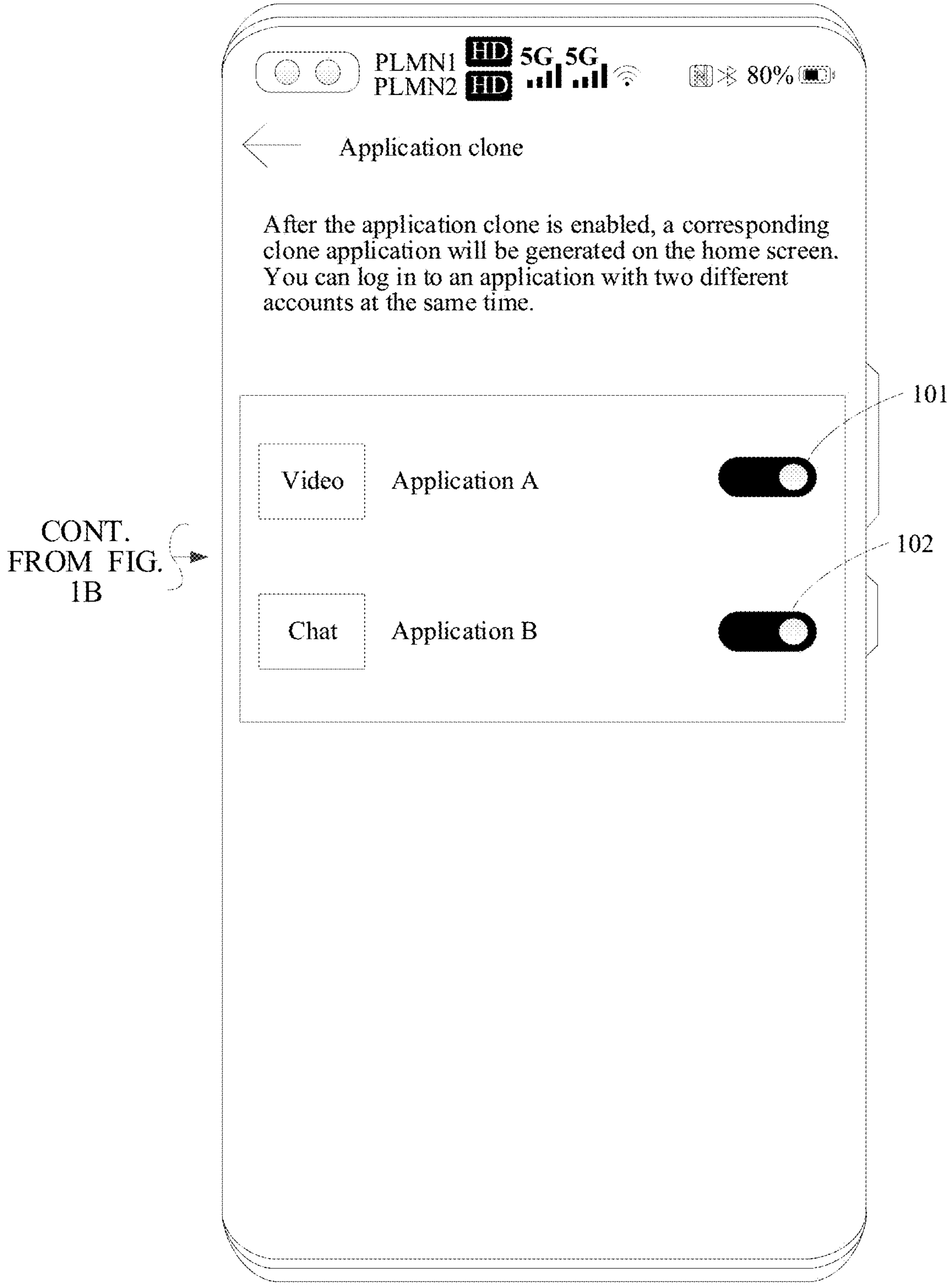

In the interface as shown in FIG. 1B, the terminal device may receive a tap operation of the user for an application clone control, and in response to the operation, display an interface as shown in FIG. 1C. The interface may include an icon of application A, an icon of application B, a control 101 of a first clone function, and a control 102 of a second clone function. The control 101 of the first clone function is configured to enable or disable a clone function of application A, and the control 102 of the second clone function is configured to enable or disable a clone function of application B. In an interface shown as FIG. 1C, both the clone functions of application A and application B are enabled.

Figure 2:
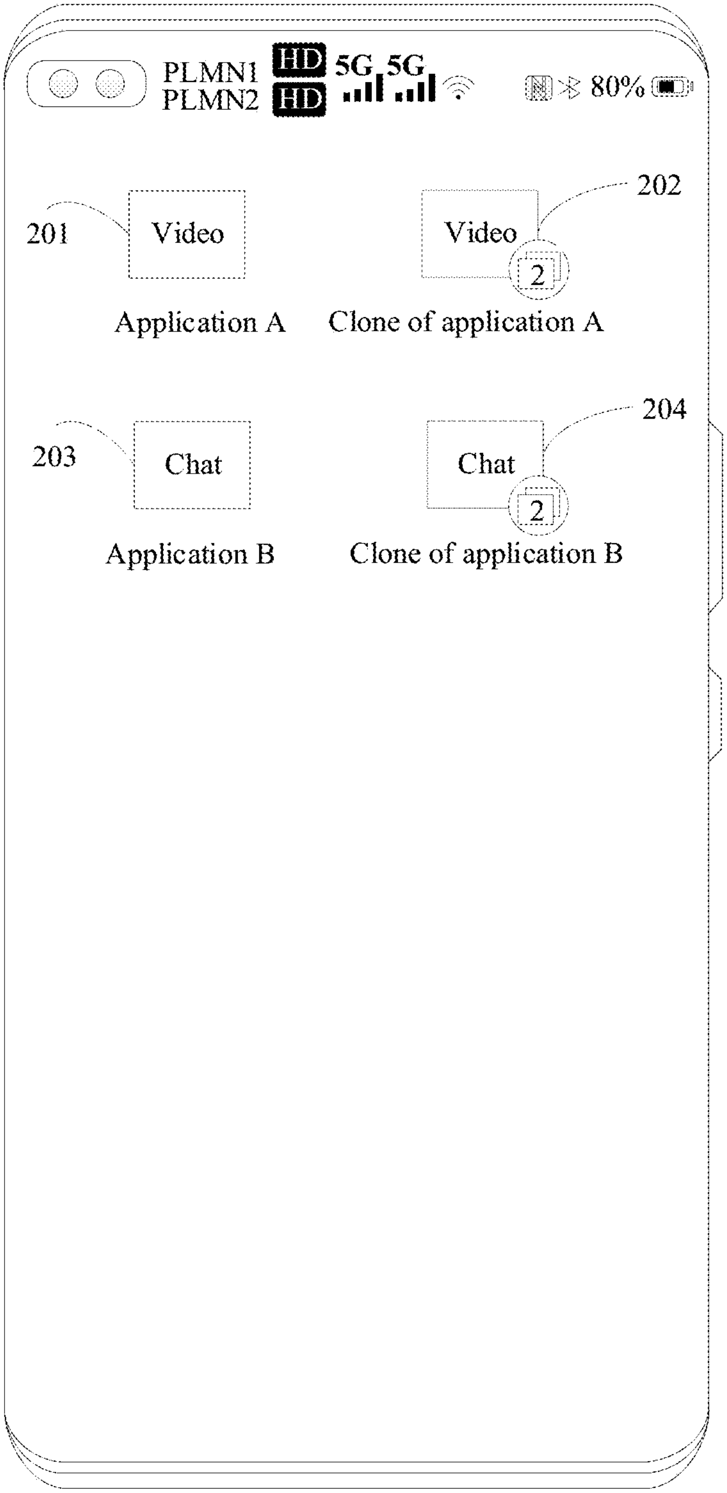
FIG. 2 is a schematic diagram of a home screen of a terminal device according to an embodiment of this application.

In interface as shown in FIG. 1C, when the clone functions of application A and application B are separately enabled, the icon of application A, an icon of a clone of application A, the icon of application B, and an icon of a clone of application B may be displayed on the home screen of the terminal device. FIG. 2 is a schematic diagram of a home screen of a terminal device.

As shown in FIG. 2, an icon 201 of application A, an icon 202 of a clone of application A, an icon 203 of application B, and an icon 204 of a clone of application B may be displayed on the home screen of the terminal device. The icon 201 of application A and the icon 202 of the clone of application A are not exactly the same, and the icon 203 of application B and the icon 204 of the clone of application B are not exactly the same. The home screen of the terminal device may further include an icon of another application (not shown in FIG. 2).

2. Owner user: It is a main user of a terminal device. The terminal device may further include a sub-user and a guest user. Authorization from the owner is needed to use some functions under the sub-user and the guest user. For example, the sub-user and the guest user do not support a clone function of an application. A user may view whether the user is the owner user in settings of the terminal device, and may add the sub-user and the guest user in the settings.

FIG. 3 is a schematic diagram of an interface for viewing an owner user.

Figure 3A:
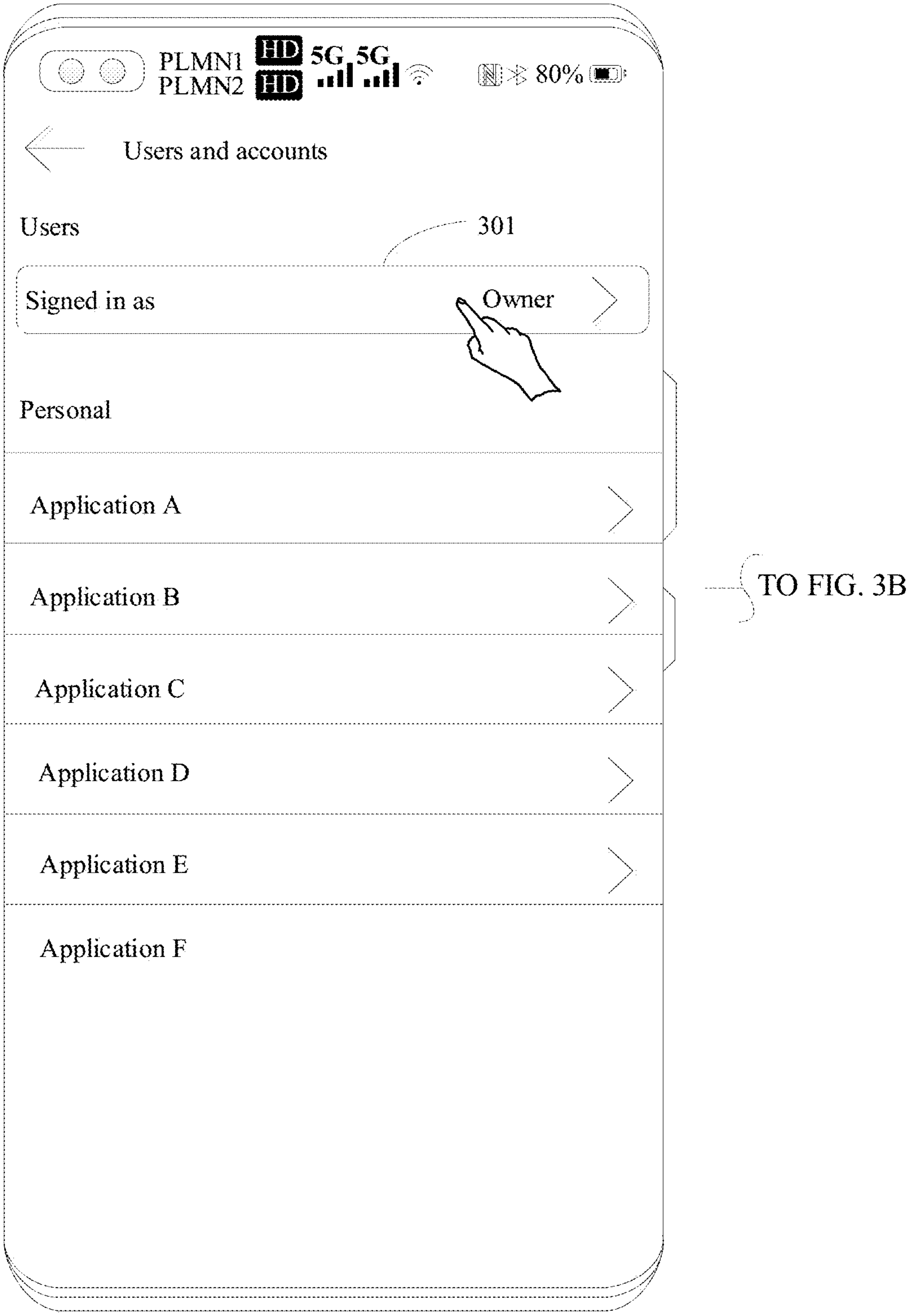
FIG. 3 is a schematic diagram of an interface for viewing an owner user according to an embodiment of this application.

For example, when the terminal device receives a tap operation of a user for the user and account control in the interface as shown in FIG. 1A, an interface as shown in FIG. 3A may be displayed. The interface may include a control 301 and applications installed on the terminal device of the owner user, including application A, application B, application C, application D, application E, and application F. The control 301 includes a currently logged-in user. For example, in the interface as shown in FIG. 3A. The user logged in to the terminal device is the owner user.

Figure 3B:
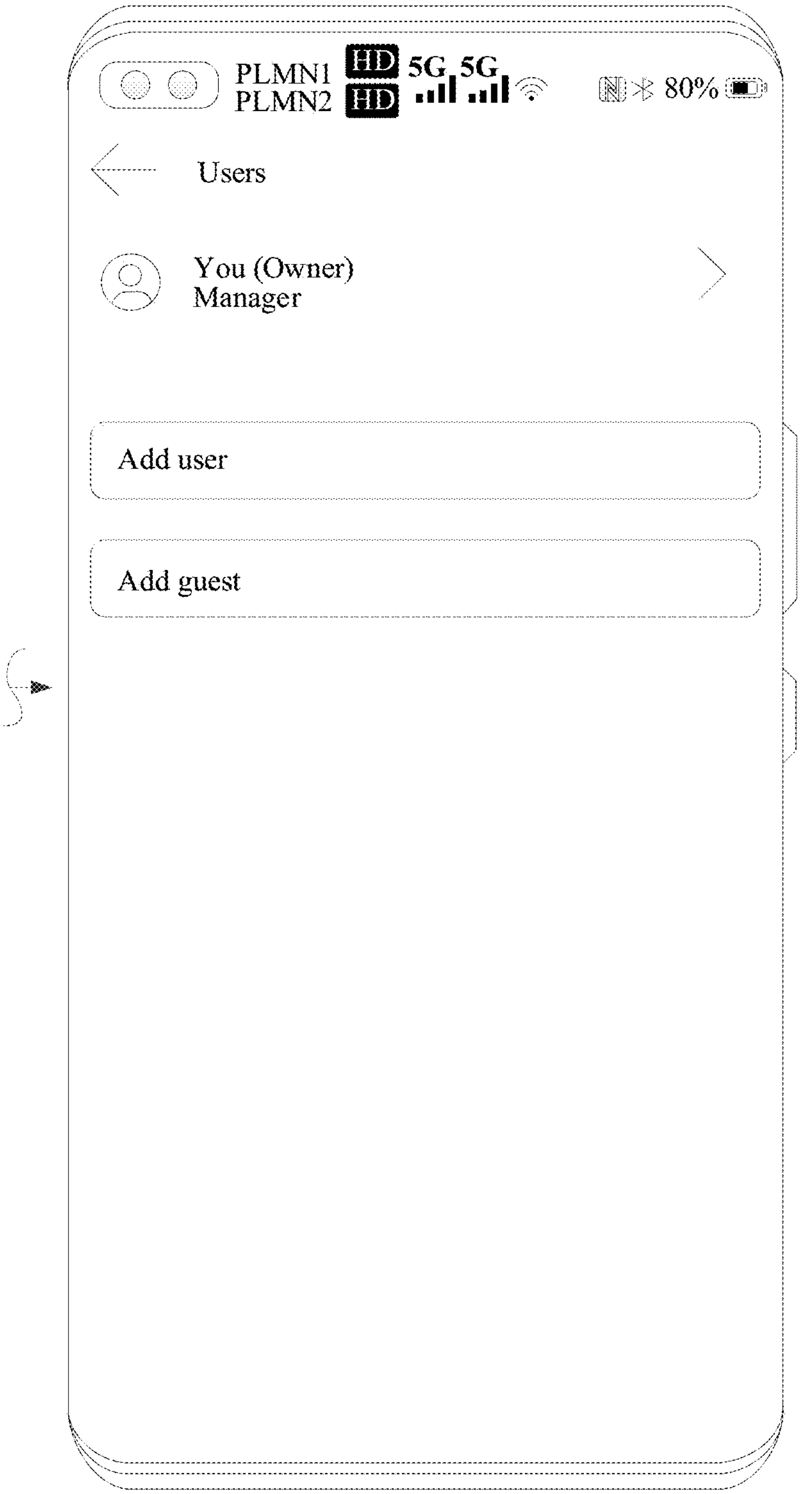

In the interface as shown in FIG. 3A, the terminal device may receive a tap operation of the user for the control 301, and in response to the operation, display an interface as shown in FIG. 3B. The interface may include the owner user, a control for adding a user, and a control for adding a guest. The user may operate the control for adding a user to add a sub-user in the terminal device, and may operate the control for adding a guest to add a guest user in the terminal device.

3. Other Terms:

In this embodiment of this application, terms such as "first" and "second" are used to distinguish same or similar items with a basically same function and role. For example, a first chip and a second chip are merely used to distinguish different chips, and are not intended to limit a sequence thereof. A person skilled in the art may understand that the terms "first", "second", and the like do not limit a quantity and an execution order, and the terms "first", "second", and the like are not limited to be necessarily different.

It should be noted that in this embodiment of this application, the terms such as "example" or "for example" are used to represent giving an example, an illustration, or a description. Any embodiment or design solution described as "example" or "for example" in this application should not be construed as being preferred or advantageous over other embodiments or design solutions. In particular, the terms such as "example" and "for example" used herein are intended to present the related concept in a specific implementation.

In embodiments of this application, "at least one" refers to one or more, and "a plurality of" refers to two or more. The term "and/or" describes an association relationship between associated objects and indicates that three relationships may exist. For example, A and/or B may represent: only A exists, both A and B exist, and only B exists, where A and B may be singular or plural. The character "/" generally represents that the associated object is in an "or" relationship. "At least one of the following items (pieces)" or similar expressions refer to any combination of these items, including any combination of singular item (piece) or plural items (pieces). For example, at least one of a, b, or c may represent: a, b, c, a and b, a and c, b and c, or a, b, and c, where a, b, and c may be singular or plural.

4. Terminal Device:

A terminal device in this embodiment of this application may alternatively be any form of an electronic device. For example, the electronic device may include a handheld device having an image processing function, a vehicle-mounted device, or the like. For example, some electronic devices are mobile phones (mobile phone), tablet computers, palmtop computers, notebook computers, mobile internet devices (mobile internet devices, MIDs), wearable devices, virtual reality (virtual reality, VR) devices, augmented reality (augmented reality, AR) devices, wireless terminals in industrial control (industrial control), wireless terminals in self-driving (self-driving), wireless terminals in a remote medical surgery (remote medical surgery), wireless terminals in a smart grid (smart grid), wireless terminals in transportation safety (transportation safety), wireless terminals in a smart city (smart city), wireless terminals in a smart home (smart home), cellular phones, cordless phones, session initiation protocol (session initiation protocol, SIP) phones, wireless local loop (wireless local loop, WLL) stations, personal digital assistants (personal digital assistants, PDAs), handheld devices with wireless communication functions, computing devices or other processing devices connected to wireless modems, vehicle-mounted devices, wearable devices, terminal devices in a 5G network, terminal devices in a future evolved public land mobile network (public land mobile network, PLMN), or the like. This is not limited in this embodiment of this application.

As an example but not a limitation, in this embodiment of this application, the electronic device may alternatively be a wearable device. The wearable device may also be referred to as a wearable smart device, and is a collective term for wearable devices developed by intelligently designing daily wearing based on a wearable technology, for example, glasses, gloves, a watch, clothing, and shoes. A wearable device is a portable device that can be directly worn on a body or integrated into clothes or an accessory of a user. A wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in this embodiment of this application, the electronic device may alternatively be a terminal device in an Internet of Things (Internet of Things, IoT) system. The IoT is an important part of future information technology development. A main technical feature of the IoT is to connect an object to a network by using a communication technology, to implement an intelligent network with a human-machine interconnection and an object-object interconnection.

In this embodiment of this application, the electronic device may also be referred to as a terminal device, user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

In this embodiment of this application, the electronic device or each network device includes a hardware layer, an operating system layer running over the hardware layer, and an application layer running over the operating system layer. The hardware layer includes hardware such as a central processing unit (central processing unit, CPU), a memory management unit (memory management unit, MMU), and a memory (alternatively referred to as a main memory). The operating system may be any one or more computer operating systems for implementing service processing through a process (process), for example, a Linux operating system, a Unix operating system, an Android operating system, an iOS operating system, or a Windows operating system. The application layer includes applications such as a browser, an address book, word processing software, and instant messaging software.

In some scenarios, there may be a scenario where a clone application of an application is used to start a clone application of another application in the terminal device. For example, when the terminal device displays an interface of an application clone, the user may start another application clone by using a sharing function in the interface of the application clone, so that the terminal device displays an interface of another application clone, so as to implement to share content in the application clone to another application clone.

For example, FIG. 4 is a schematic diagram of an interface for sharing content from a clone of application A to a clone of application B in an implementation.

Figure 4A:
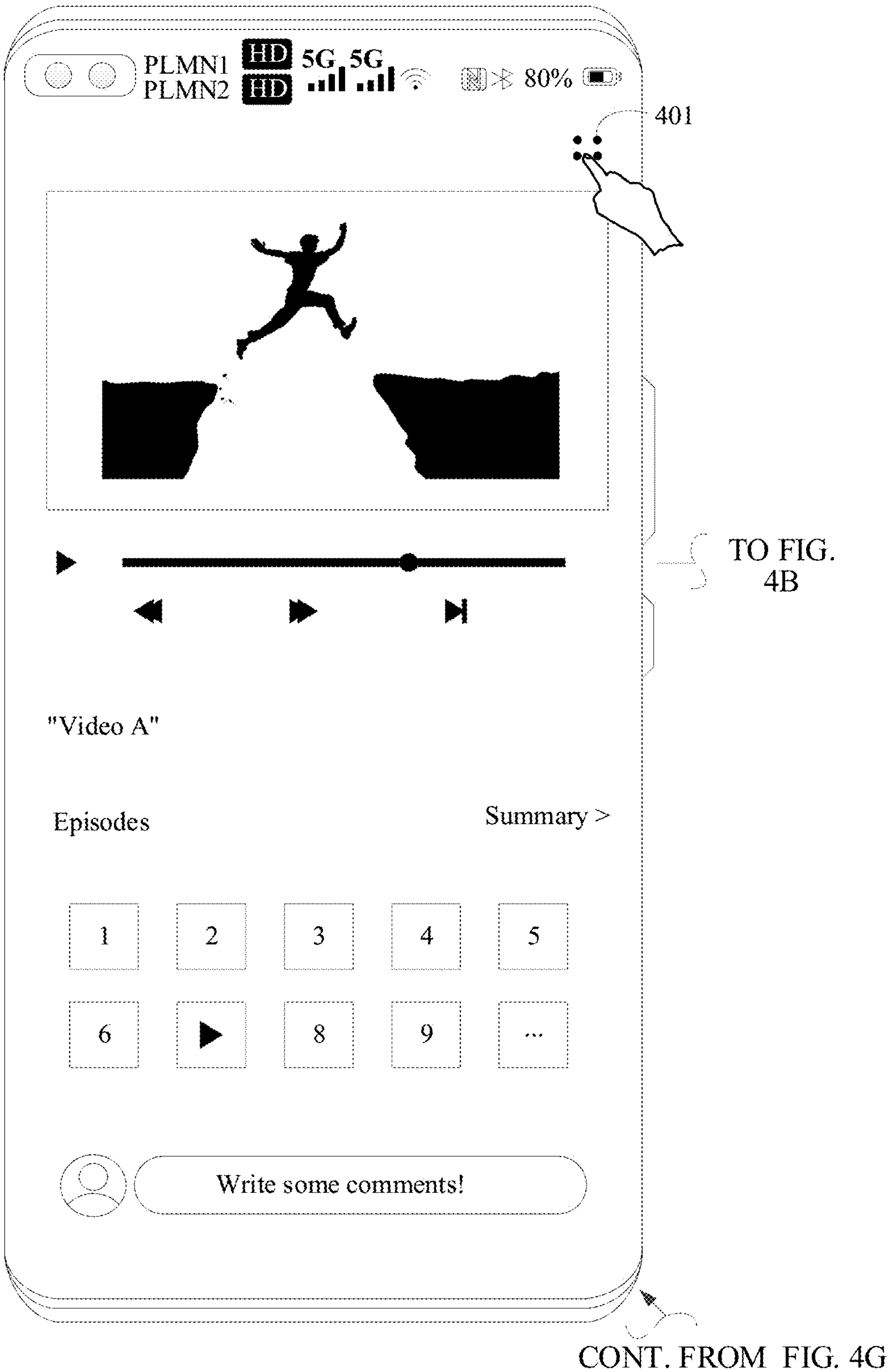
FIG. 4 is a schematic diagram of an interface for sharing content from a clone of application A to a clone of application B according to an embodiment of this application.

For example, an interface shown in FIG. 4A is an interface of the clone of application A. The interface may include a control 401 for sharing interface content and content of a clone of application A. The content of the clone of application A may include video A and related information of video A. A user may tap the control 401 for sharing interface content. The terminal device may receive a tap operation of the user for the control 401 for sharing interface content, and in response to the tap operation, display an interface as shown in FIG. 4B.

Figure 4B:
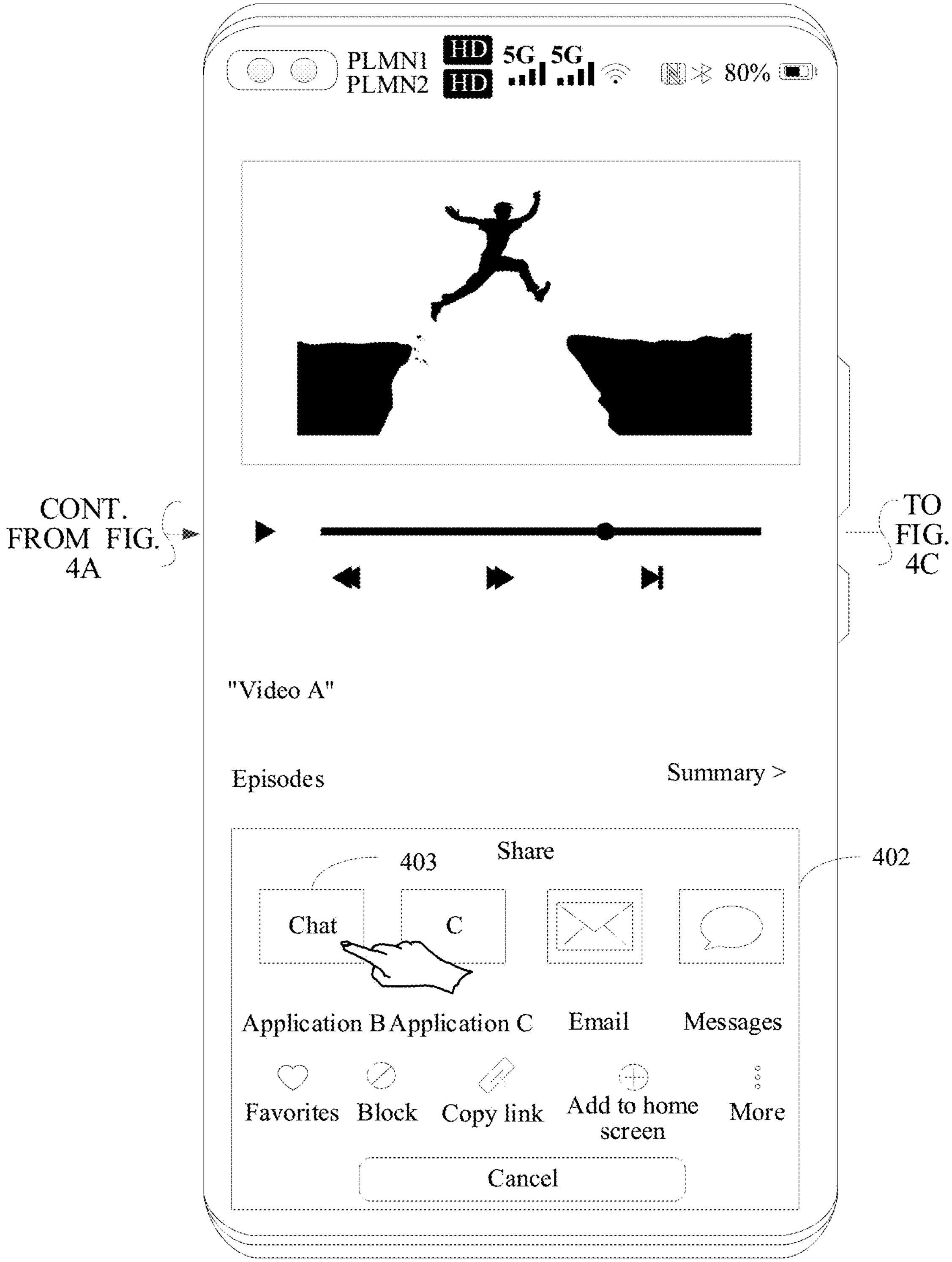

The interface as shown in FIG. 4B may include a sharing bar 402 and part or all of the content of the clone of application A.

The sharing bar 402 may be displayed in a form of floating window, or may be displayed in a form of split-screen or card. A size of the sharing bar 402 may be smaller than or equal to a screen size of the terminal device. A specific display form and interface size of the sharing bar 402 are not limited in this embodiment of this application.

The sharing bar 402 may be displayed at a lower part of a screen of the terminal device, or may be displayed at an upper part or a side of a screen of the terminal device. A specific display form and display position of the sharing bar 402 are not limited in this embodiment of this application.

The sharing bar 402 may display icons corresponding to a plurality of sharing manners and a plurality of function icons. The icons corresponding to the sharing manners may include an icon 403 of application B, an icon of application C, an icon of email, an icon of text message, and the like. The function icons may include a favorite icon, a blocking icon, a copy link icon, an adding to home screen icon, and icons of more functions. The function icons may be used for perform a corresponding operation on content displayed on the clone of application A.

In the interface as shown in FIG. 4B, the user may tap the icon 403 of application B in the sharing bar 402. The terminal device receives a tap operation of the user for the icon 403 of application B, and in response to the tap operation, displays an interface as shown in FIG. 4C.

Figure 4C:
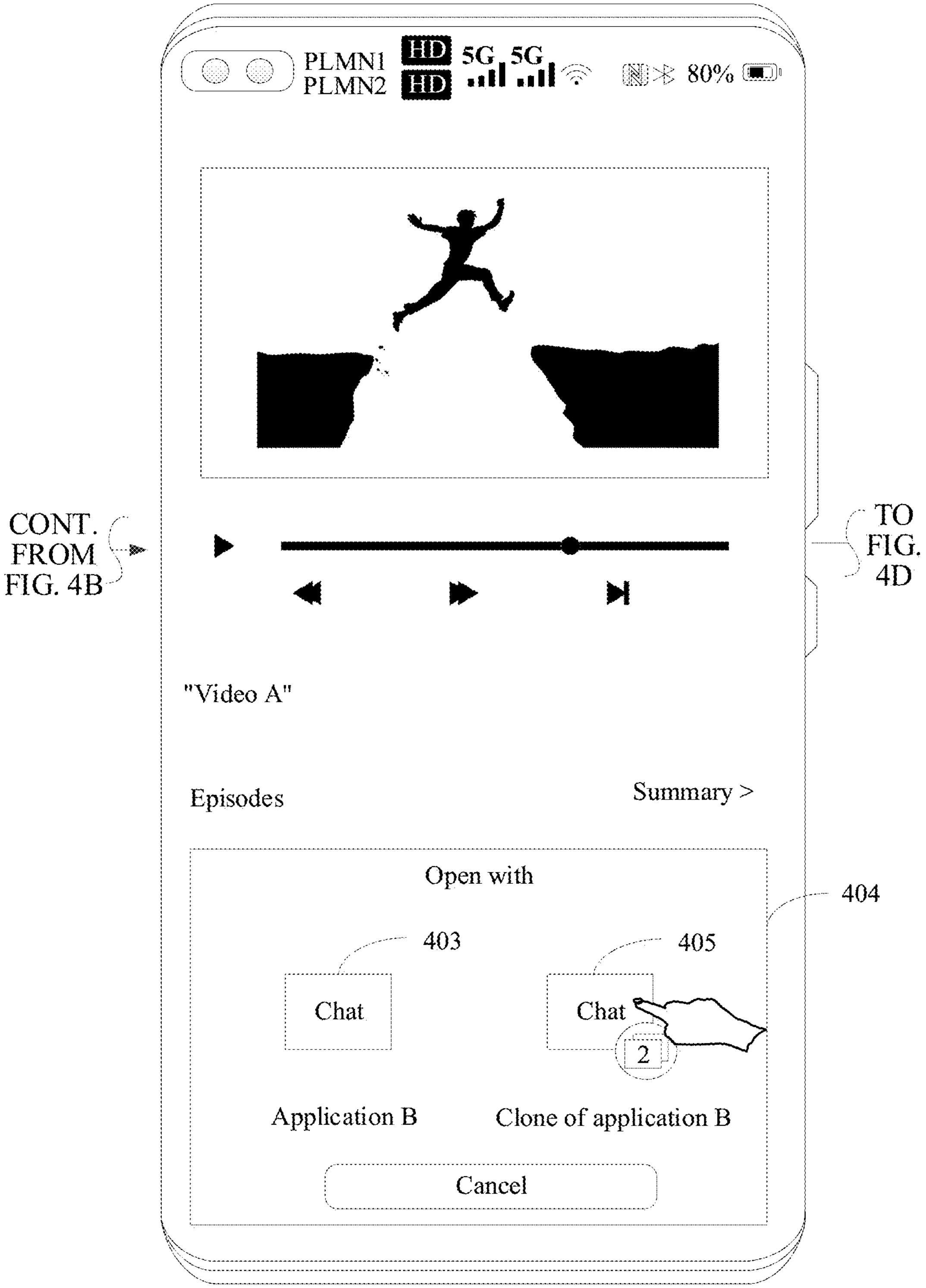

The interface shown in FIG. 4C may include an opening manner selection bar 404 and the content of the clone of application A. Because application B has a clone application, the opening manner selection bar 404 may include the icon 403 of application B and an icon 405 of the clone of application B.

The opening manner selection bar 404 may be displayed in a form of floating window, or may be displayed in a form of split-screen or card. A size of the opening manner selection bar 404 may be smaller than or equal to a screen size of the terminal device. A specific display form and interface size of the opening manner selection bar 404 are not limited in this embodiment of this application.

The opening manner selection bar 404 may be displayed at a lower part of a screen of the terminal device, or may be displayed at an upper part or a side of a screen of the terminal device. A specific display form and display position of the opening manner selection bar 404 are not limited in this embodiment of this application.

In the interface as shown in FIG. 4C, if the user wants to share video A to the clone of application B, the user may tap the icon 405 of the clone of application B in the opening manner selection bar 404. The terminal device may receive a tap operation of the user for the icon 405 of the clone of application B, and in response to the tap operation, display an interface as shown in FIG. 4D.

Figure 4D:
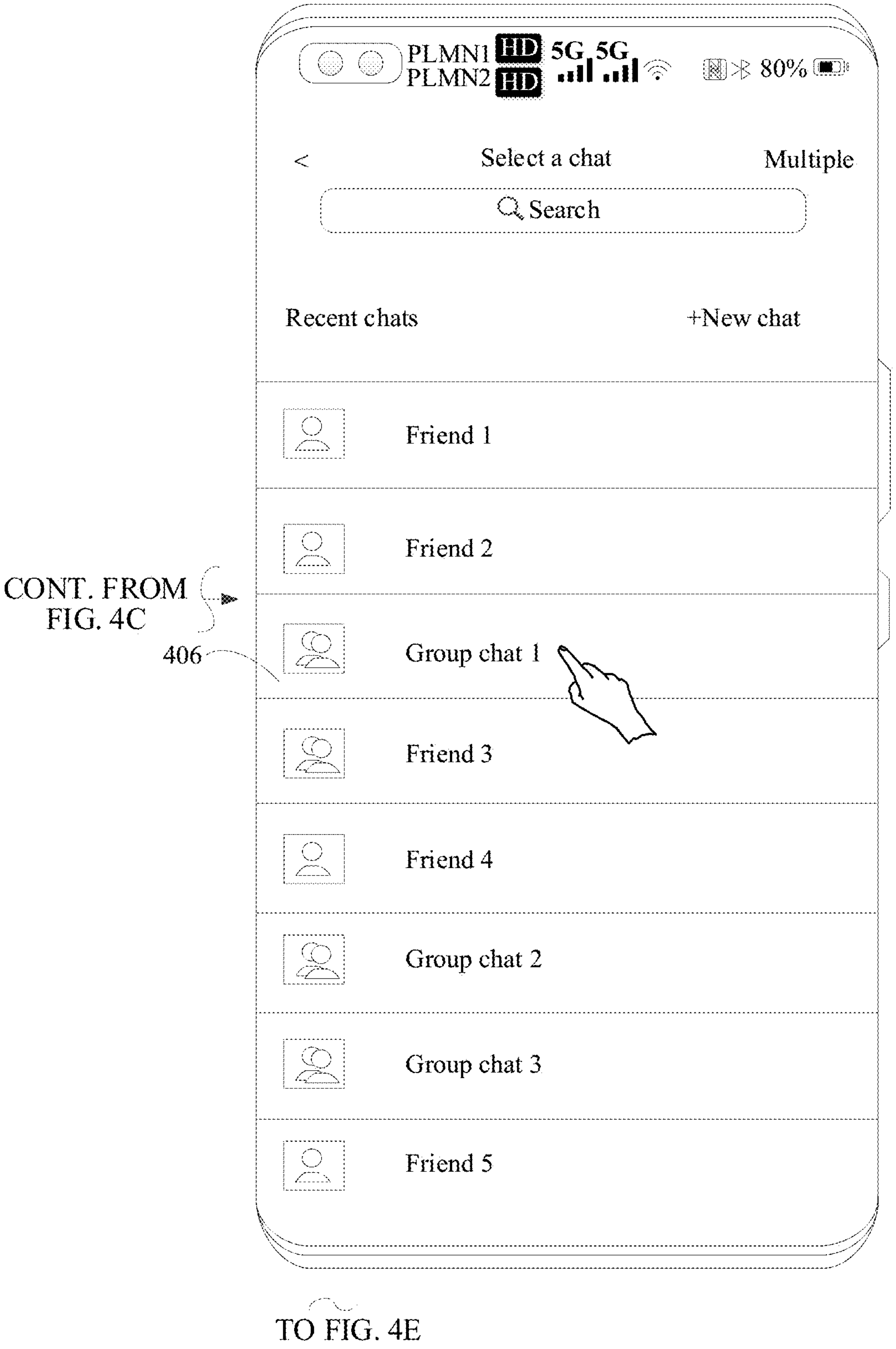

The interface as shown in FIG. 4D is an interface of the clone of application B. The interface may include a chat window 406 of group chat 1 and a plurality of other chat windows. The chat windows may include a chat window of friend 1, a chat window of friend 2, a chat window of friend 3, a chat window of friend 4, a chat window of group chat 2, a chat window of group chat 3, a chat window of friend 5, and the like. The user may flick up and down in the interface as shown in FIG. 4D to display more chat windows.

In the interface as shown in FIG. 4D, when the user wants to share video A to the chat window of group chat 1, the user may tap the chat window 406 of group chat 1. The terminal device receives a tap operation of the user for the chat window of group chat 1, and in response to the tap operation, may display an interface as shown in FIG. 4E.

Figure 4E:
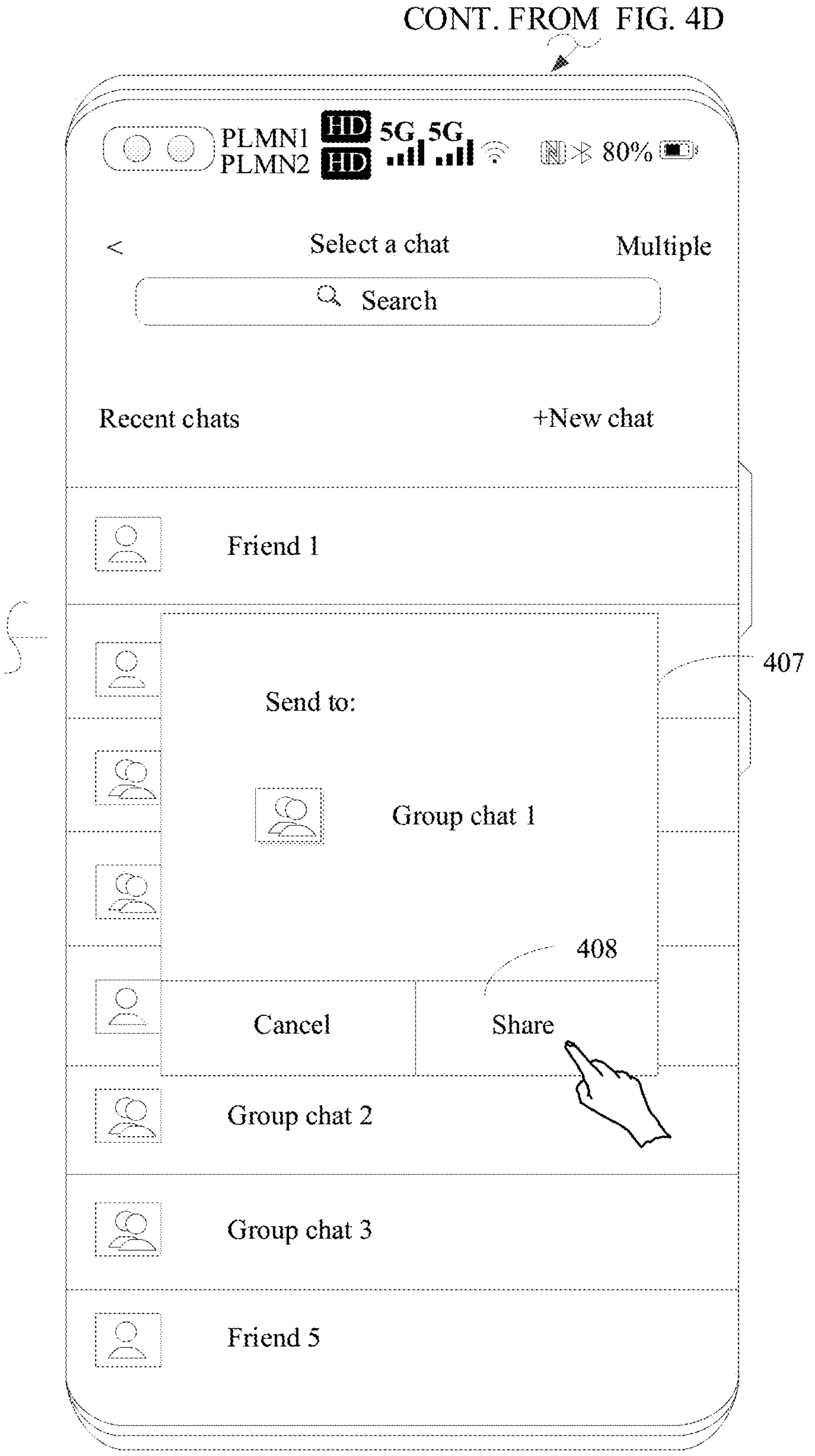

The interface as shown as FIG. 4E may include chat windows and a confirmation bar 407 for confirming whether to share the content of the clone of application A to group chat 1. The confirmation bar 404 includes a cancel control and a sharing control 408.

The confirmation bar 407 may be displayed in a form of floating window, or may be displayed in a form of split-screen or card. A size of the confirmation bar 407 may be smaller than or equal to a screen size of the terminal device. A specific display form and interface size of the confirmation bar 407 are not limited in this embodiment of this application.

The confirmation bar 407 may be displayed at a lower part of a screen of the terminal device, or may be displayed at an upper part or a side of a screen of the terminal device. A specific display form and display position of the confirmation bar 407 are not limited in this embodiment of this application.

In the interface as shown in FIG. 4E, the user may tap the sharing control 408 in the confirmation bar 407. The terminal device may receive a tap operation of the user for the sharing control 408, and in response to the tap operation, share the content of the clone of application A to the chat window of group chat 1 and display an interface as shown in FIG. 4F.

Figure 4F:
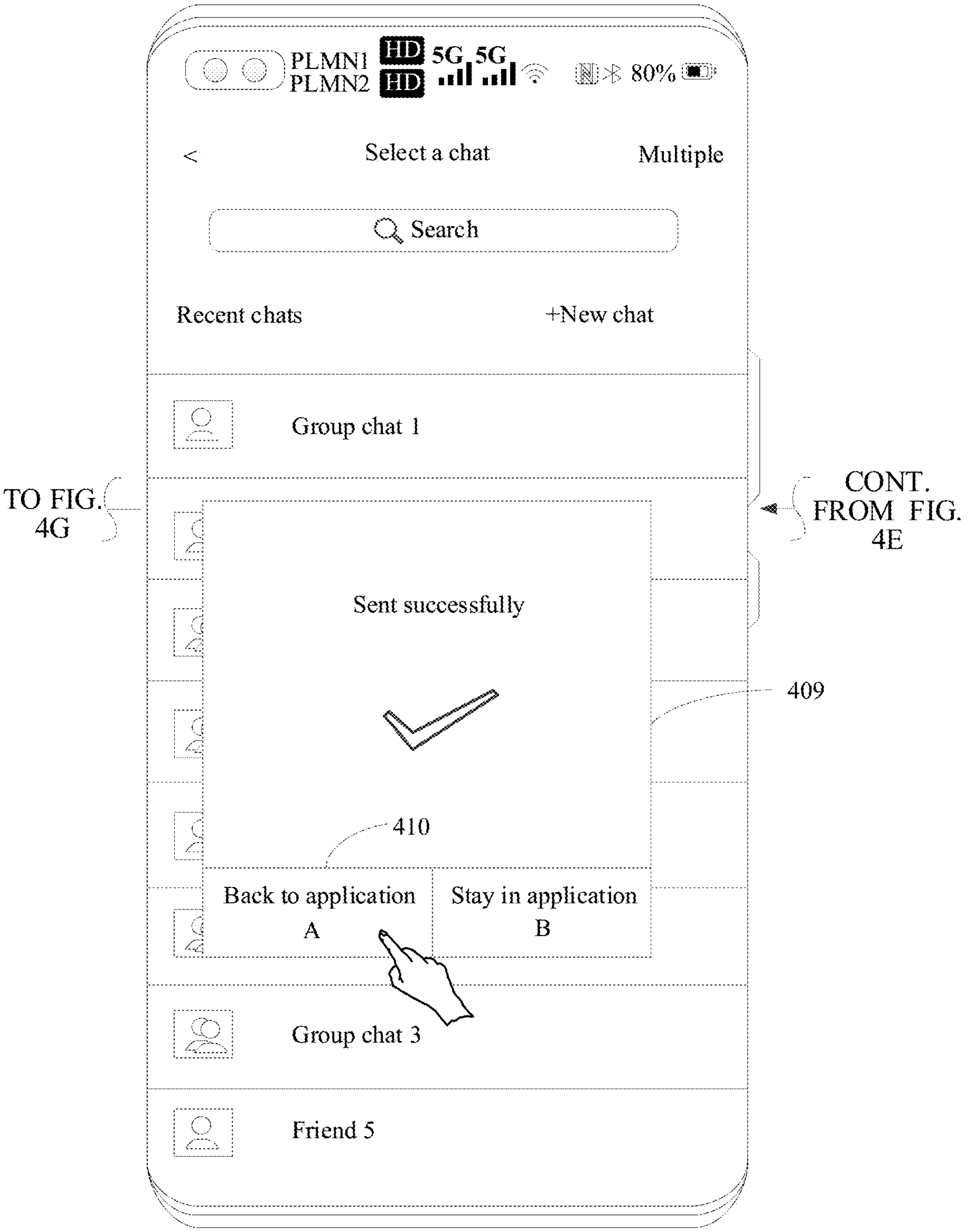

The interface as shown in FIG. 4F may include chat windows and a prompt bar 409. The prompt bar 409 includes prompt information, a control 410 for returning to application A, and a control for staying in application B.

In the interface as shown in FIG. 4F, the user may tap the control 410 for returning to application A. The terminal device may receive a tap operation of the user for the control 410 for returning to application A, and in response to the tap operation, display an interface as shown in FIG. 4G.

Figure 4G:
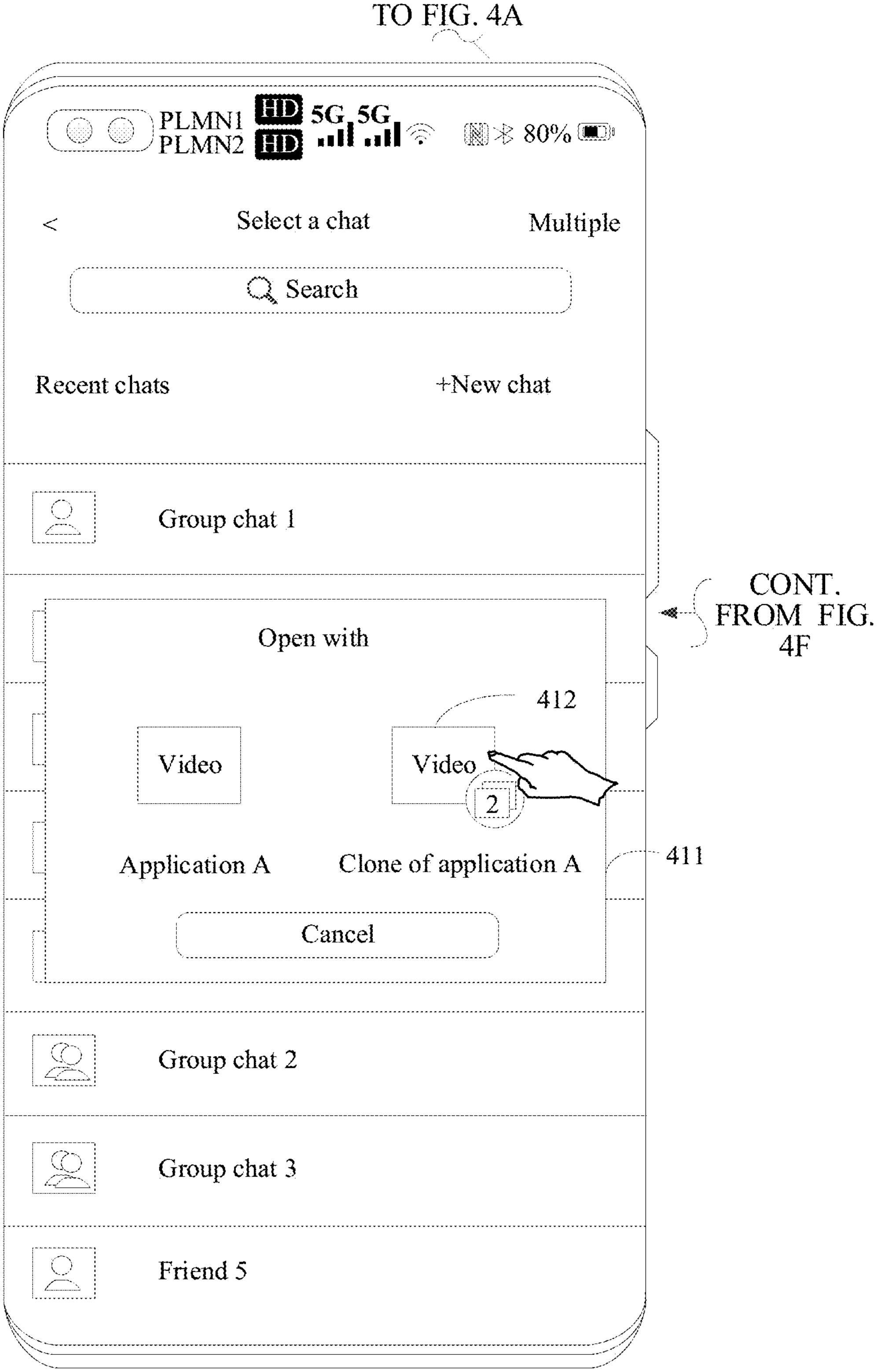

The interface as shown in FIG. 4G may include chat windows and a return manner selection bar 411. Because application A has a clone, the return manner selection bar 411 may include an icon of application A and an icon 412 of the clone of application A. The user may select to return to application A or the clone of application A in the return manner selection bar 411.

In the interface as shown in FIG. 4G, the user may tap the icon 412 of the clone of application A. The terminal device may receive a tap operation of the user for the icon 412 of the clone of application A, and in response to the tap operation, return to the clone of application A and display the interface as shown in FIG. 4A.

In a process of content sharing shown in FIG. 4, the user needs to perform a plurality of operations on an icon of an application or an icon of an application clone displayed in the interface, so that the process is cumbersome, and user experience is poor.

In view of this, this embodiment of this application provides an application clone-based interface display method. When returning from a second application clone to a first application clone, the terminal device may determine a time interval between a moment corresponding to opening an interface of the second application clone via an interface of the first application clone, and a moment corresponding to returning from the second application clone to the first application clone. When the time interval is less than or equal to first preset duration, the terminal device may display the interface of the first application clone in response to an operation of returning to the first application clone from the second application clone. In this way, when returning from the second application clone to the first application clone, the user does not need to select between the icon of the first application and the icon of the first application clone. An operation process of jumping between interfaces of application clones is simplified to save user's time, so that user experience is improved.

The application clone-based interface display method in this embodiment of this application is described below in detail with reference to specific embodiments. The following embodiments may be combined with each other or separately implemented, and same or similar concepts or processes may not be described repeatedly in some embodiments.

FIG. 5 is a schematic diagram of an interface for jumping between an interface of a clone of application A and an interface of a clone of application B according to an embodiment of this application.

For example, when the application clone-based interface display method provided in this embodiment of this application is applied to a content sharing scenario, shared content may be multimedia information. The multimedia information may include one or more of a text, a voice, a video, a web link, a geographical position, and the like. An example in which the shared content is video information is used in FIG. 5. The example does not constitute a limitation on this embodiment of this application.

Figure 5A:
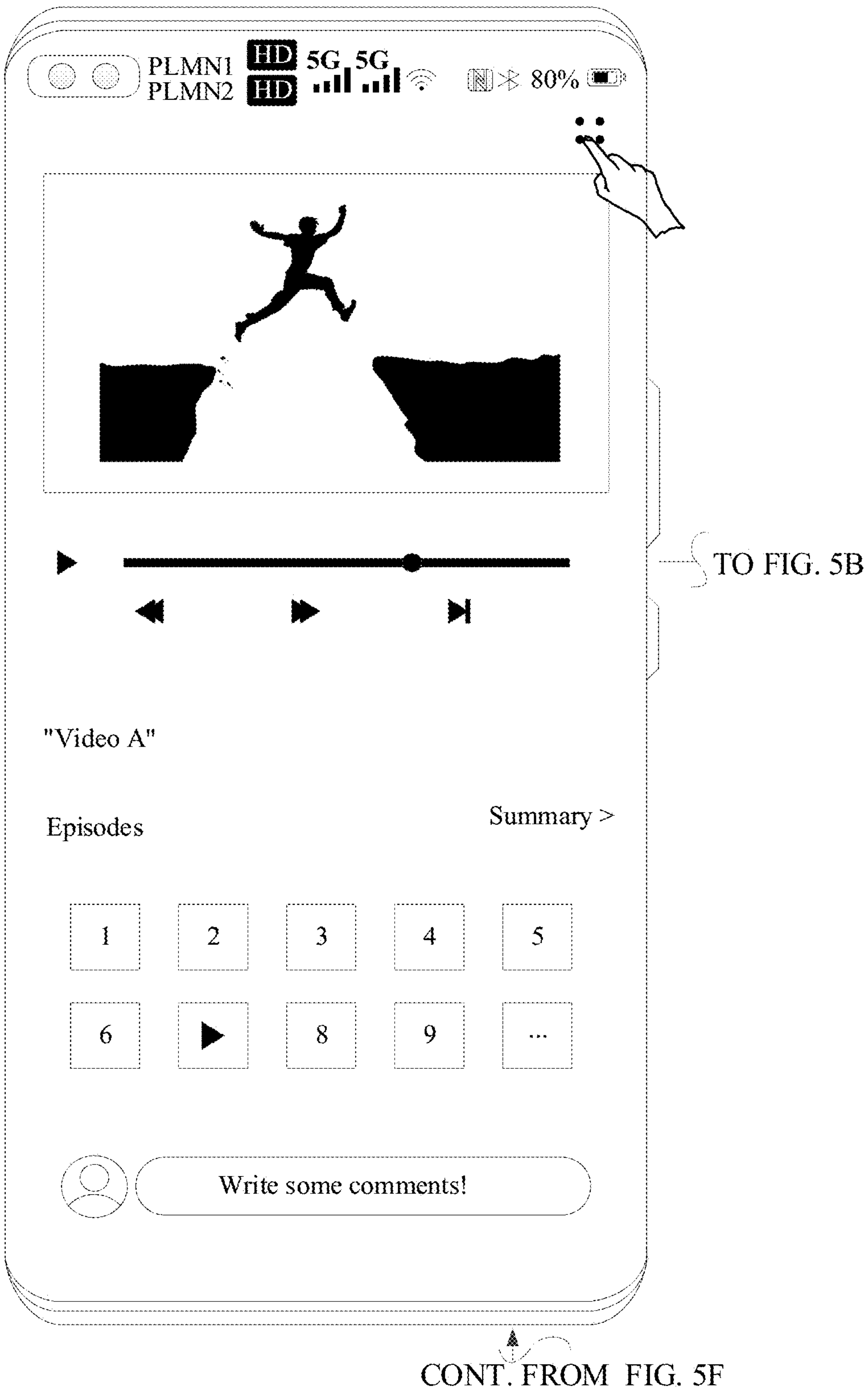
FIG. 5 is a schematic diagram of an interface for jumping between an interface of a clone of application A and an interface of a clone of application B according to an embodiment of this application.
Figure 5B:
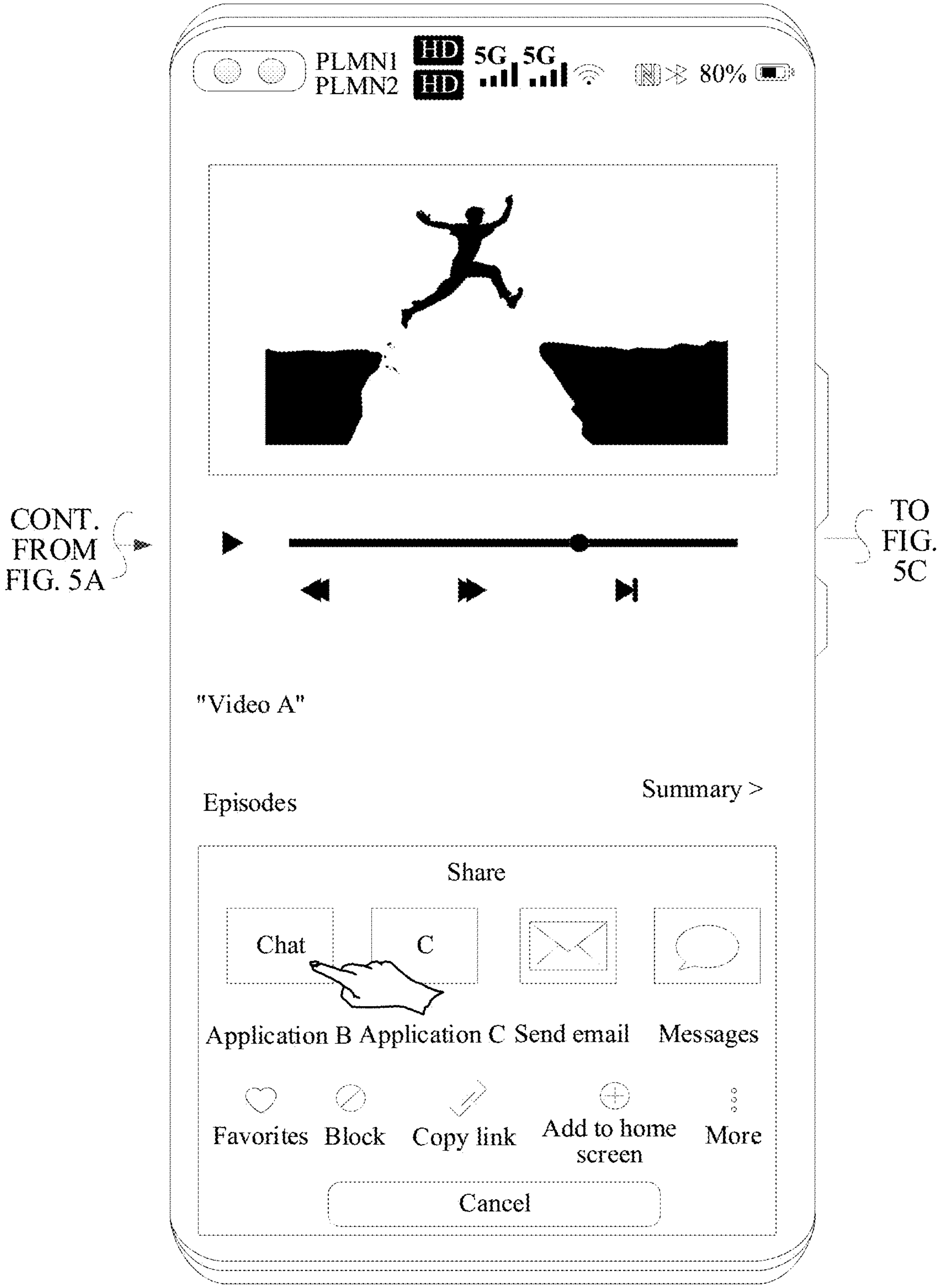
Figure 5C:
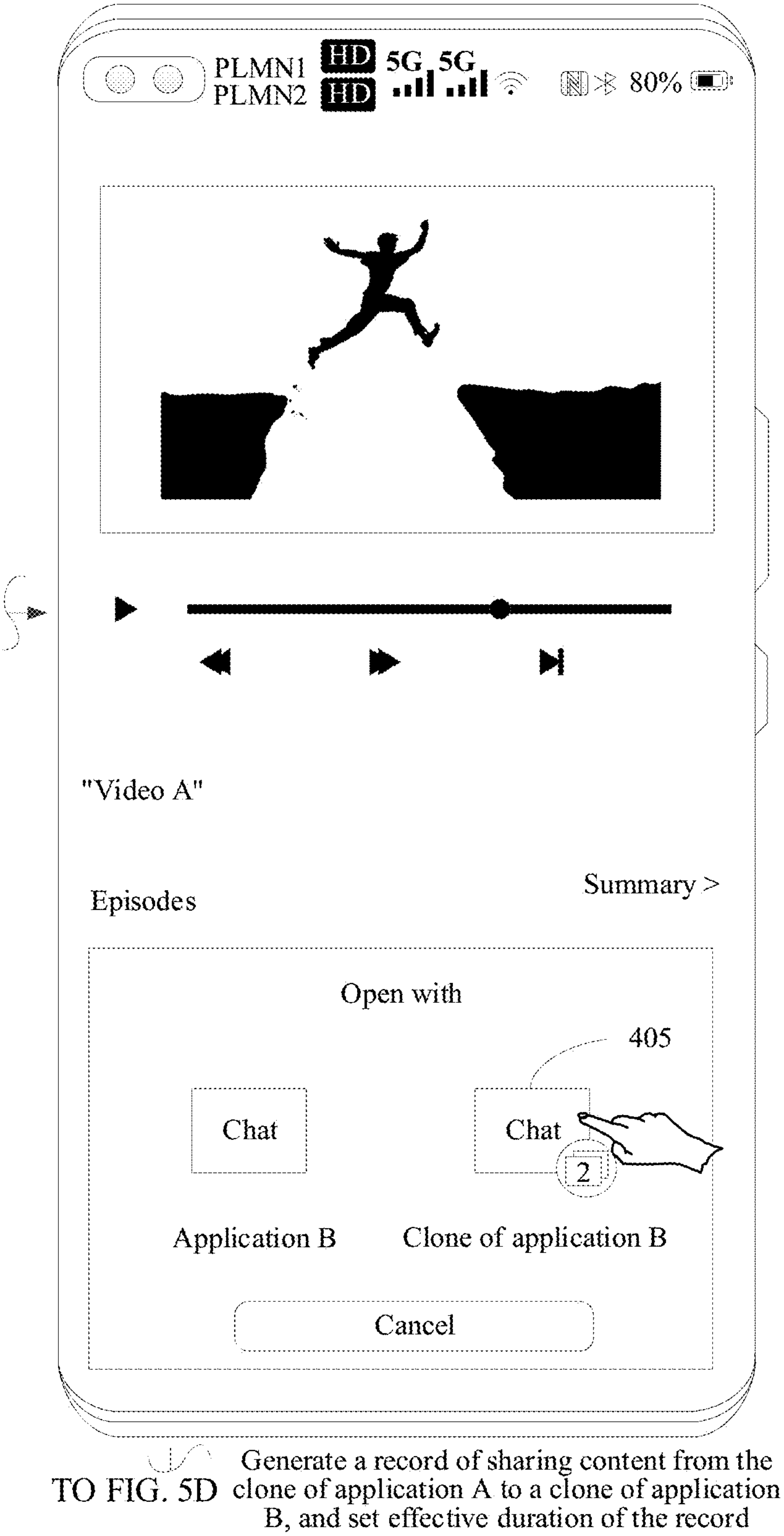

For example, interfaces shown in FIG. 5A to FIG. 5C are similar to the interfaces shown in FIG. 4A to FIG. 4C. Details are not described in this embodiment of this application again.

Figure 5D:
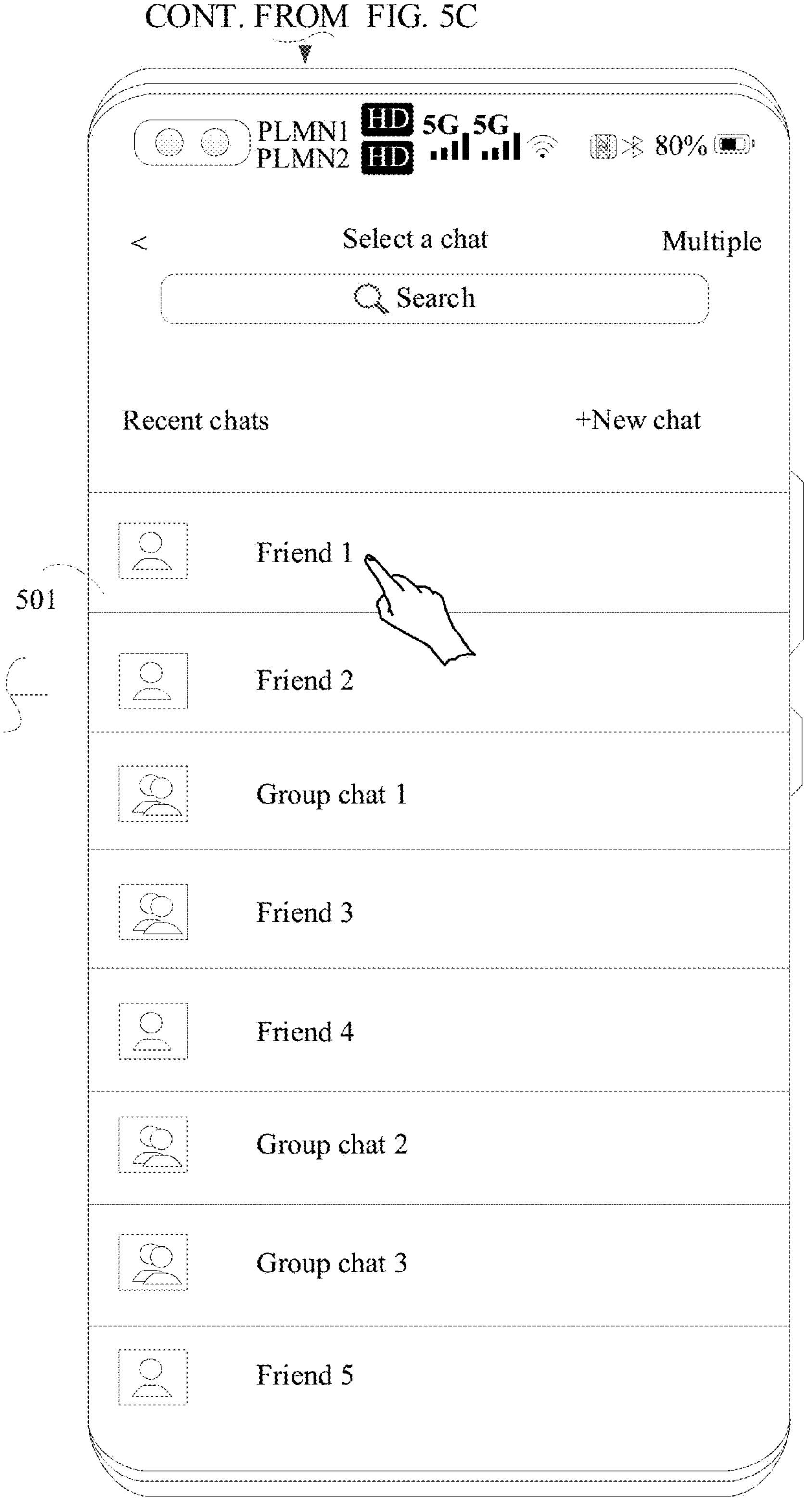

In the interface as shown in FIG. 5C, a user may tap an icon 405 of a clone of application B. A terminal device may receive a tap operation of the user for the icon 405 of the clone of application B, and in response to the tap operation, display an interface as shown in FIG. 5D. When displaying the interface as shown in FIG. 5D, the terminal device may further generate a record of jumping from the clone of application A to the clone of application B.

In the interface as shown in FIG. 5D, the user may tap a chat window 501 of friend 1. The terminal device may receive a tap operation of the user for the chat window 501 of friend 1, and in response to the tap operation, display an interface as shown in FIG. 5E.

Figure 5E:
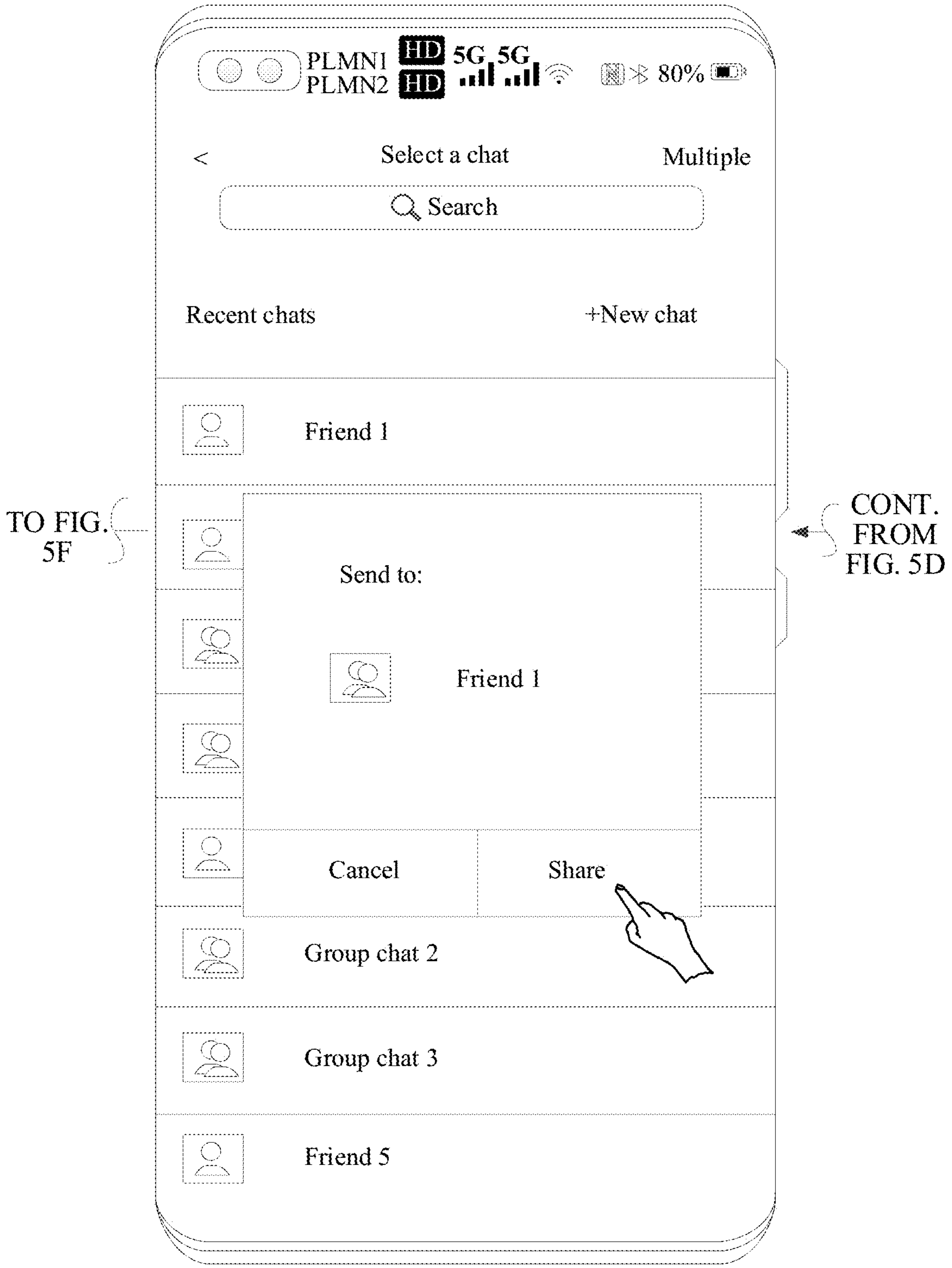
Figure 5F:
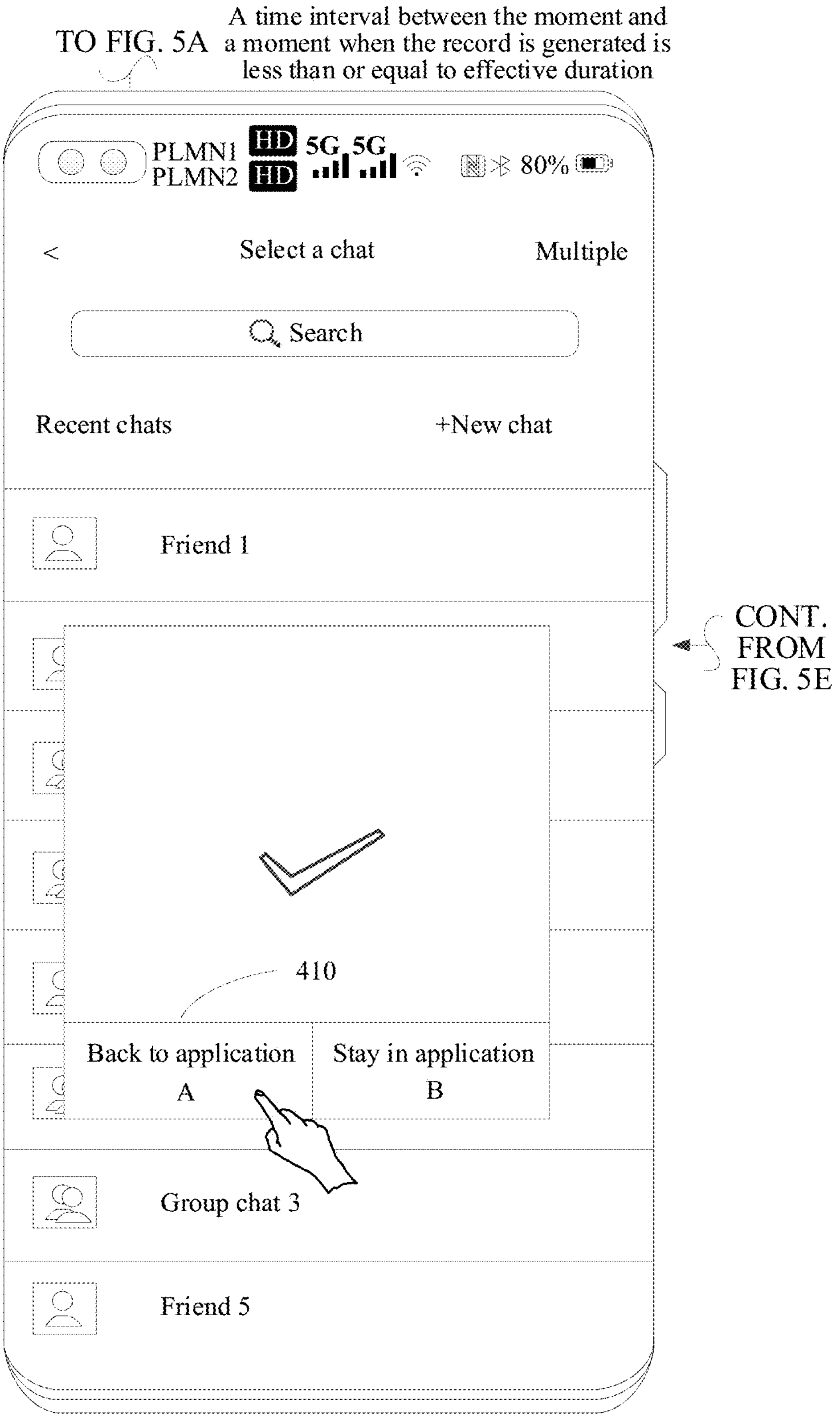

It may be understood that interfaces shown in FIG. 5D to FIG. 5F are similar to the interfaces shown in FIG. 4D to FIG. 4F. Details are not described in this embodiment of this application again.

In the interface as shown in FIG. 5F, the user may tap a control 410 for returning to application A. The terminal device may receive a tap operation of the user for the control 410 for returning to application A, and in response to the tap operation, the terminal device may obtain the record of jumping from the clone of application A to the clone of application B and determine whether the record is valid. If the record is valid, the terminal device may display the interface as shown in FIG. 5A.

For example, the terminal device may determine a time interval between a moment of receiving the tap operation of the user for the icon 405 of the clone of application B and a moment of receiving the tap operation for the control 410 for returning to application A. If the time interval is less than or equal to first preset duration, the terminal device may determine that an obtained record of sharing content from the clone of application A to the clone of application B is valid.

In a possible implementation, if the time interval is greater than the first preset duration, the terminal device determines that the record of jumping from the clone of application A to the clone of application B is invalid, and the terminal device may display the interface as shown in FIG. 4G.

It may be understood that the first preset duration may be duration set in advance, or may be set by the user according to own needs. First preset duration corresponding to records generated during jumping between different clone applications may be the same or different. The first preset duration is not limited in this embodiment of this application.

In an operation process of sharing content as shown in FIG. 5, during jumping from the clone of application A to the clone of application B, the user needs to select between an icon of application B and the icon of the clone of application B. After the content sharing is completed, during returning from the clone of application B to the clone of application A, the user does not need to select between an icon of application A and an icon of the clone of application A. The terminal device may receive an operation for the control for returning to application A and display an interface of the clone of application A. In this way, an operation process of the user for the content sharing is simplified, so that user experience is improved.

To further simplify the operation process of the user for the content sharing, the record generated by the terminal device during jumping from the clone of application A to the clone of application B may be further used in a process of the terminal device during jumping from the clone of application A to the clone of application B. FIG. 6 is a schematic diagram of an interface for jumping from a clone of application A to a clone of application B according to an embodiment of this application.

Figure 6A:
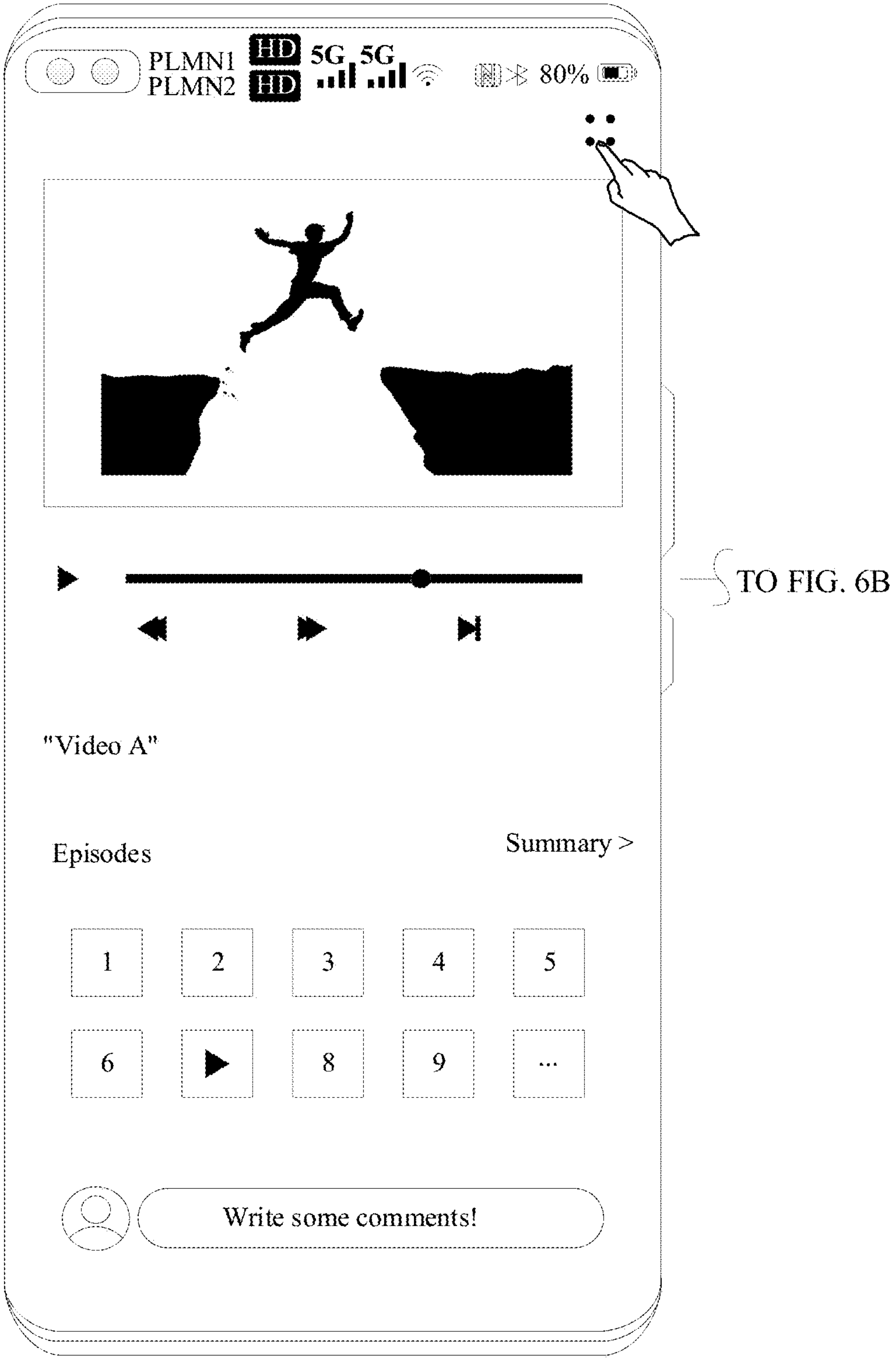
FIG. 6 is a schematic diagram of an interface for jumping from a clone of application A to a clone of application B according to an embodiment of this application.

For example, as shown in FIG. 5, after returning to the interface shown in FIG. 5A, the terminal device may perform a jumping process shown in FIG. 6. To be specific, an interface shown in FIG. 6A is an interface displayed when the terminal device receives the tap operation of the user for the control for returning to application A in the interface shown in FIG. 5F.

In the interface as shown in FIG. 6A, a user may tap the control 401 for sharing interface content. The terminal device may receive a tap operation of the user for the control 401 for sharing interface content, and in response to the tap operation, display an interface as shown in FIG. 6B.

Figure 6B:
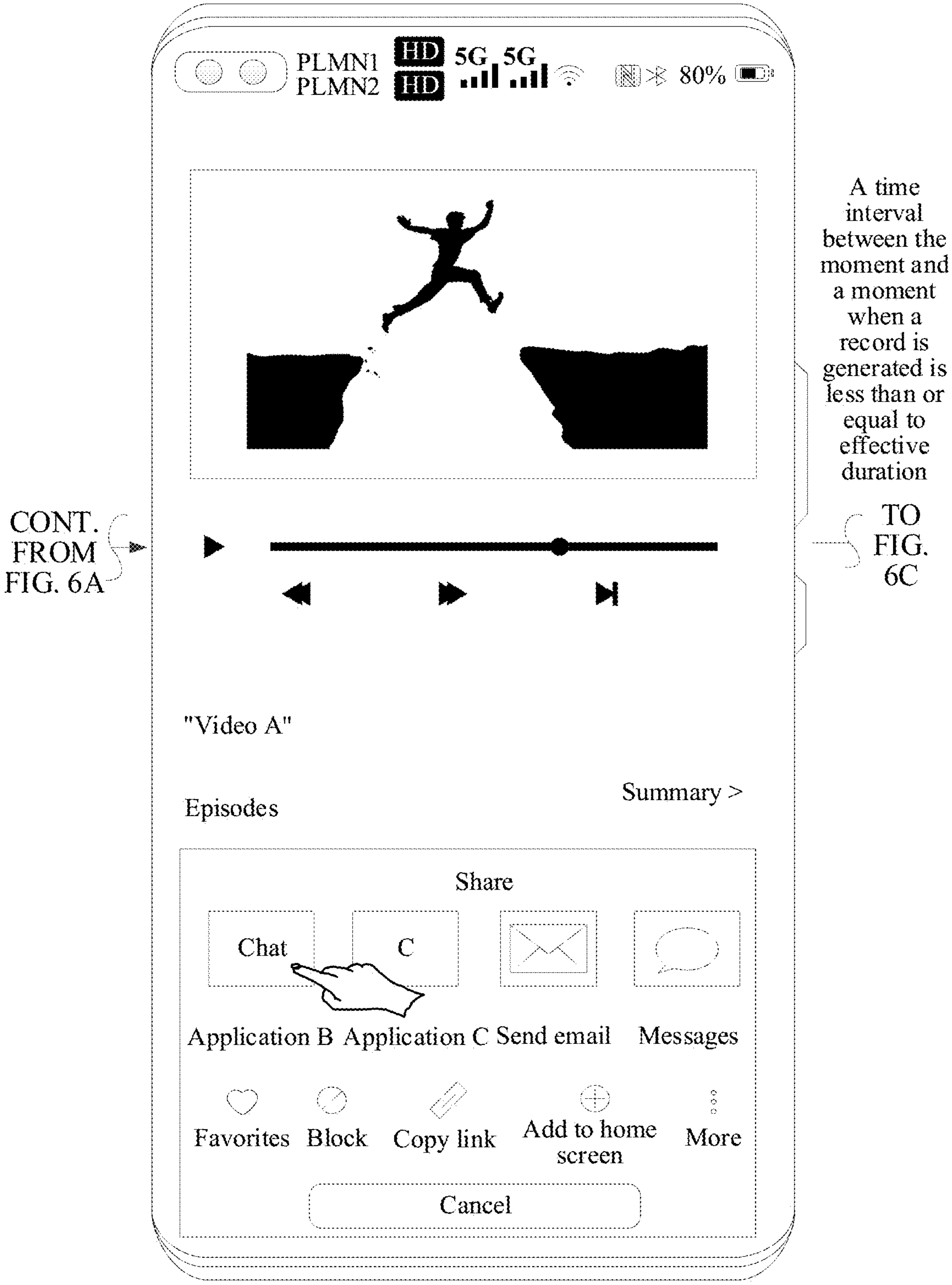
Figure 6C:
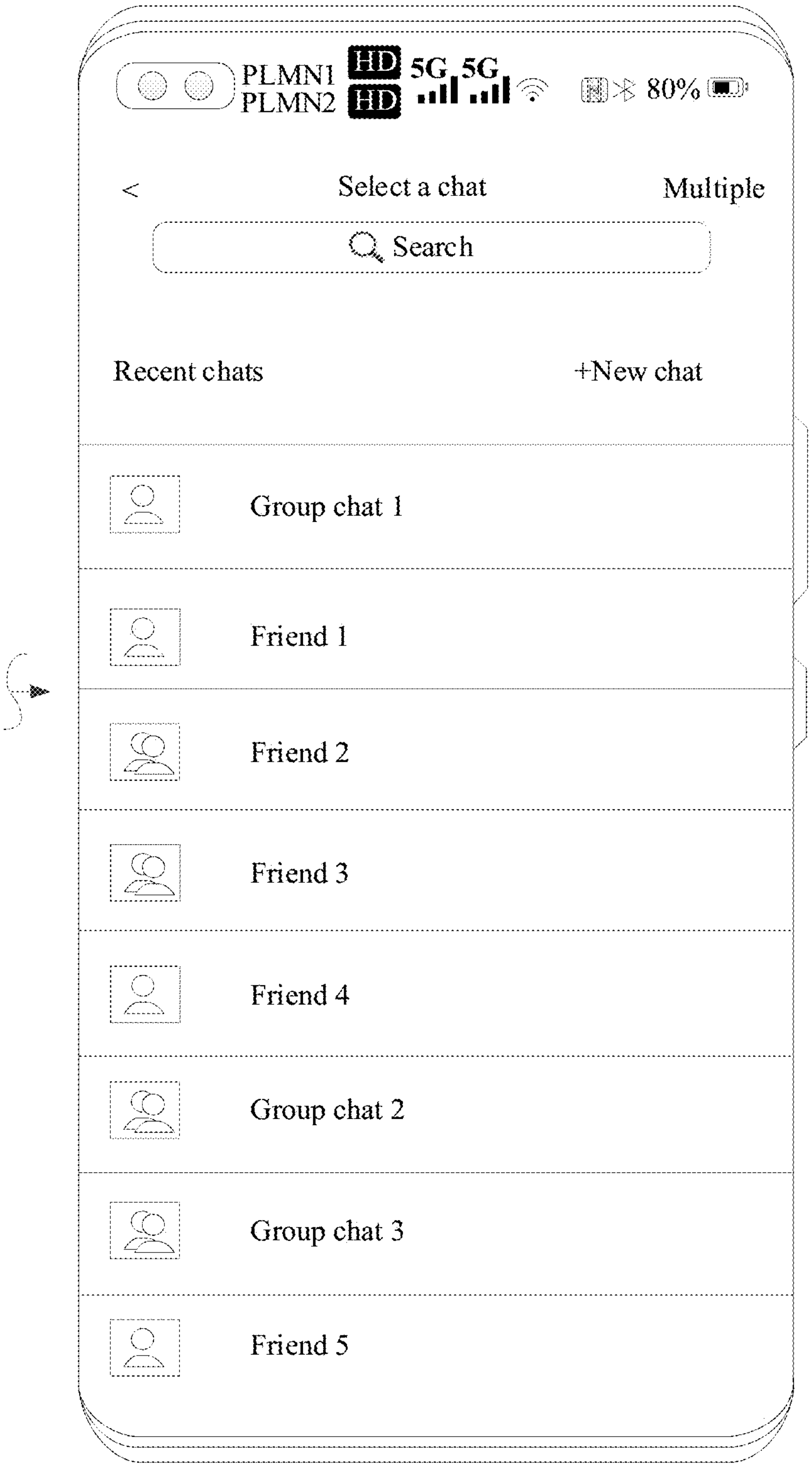

In an interface as shown in FIG. 6B, the user may tap an icon 403 of application B in a sharing bar 402. The terminal device receives a tap operation of the user for the icon 403 of application B, and in response to the tap operation, obtains a record of jumping from the clone of application A to the clone of application B and determines whether the record is valid. If the record is valid, the terminal device displays an interface as shown in FIG. 6C.

For example, the terminal device may obtain a time interval between a moment of receiving the tap operation of the user for the icon 403 of application B in the interface as shown in FIG. 6B and a moment of receiving the tap operation of the user for the icon 405 of the clone of application B in the interface as shown in FIG. 5C. Alternatively, the terminal device may obtain a time interval between a moment of receiving the tap operation of the user for the icon 403 of application B in the interface as shown in FIG. 6B and a moment of generating the record of jumping from the clone of application A to the clone of application B. If the time interval is less than or equal to second preset duration, the terminal device determines that the record of jumping from the clone of application A to the clone of application B is valid.

In a possible implementation, if the time interval is greater than the second preset duration, the terminal device determines that the record of jumping from the clone of application A to the clone of application B is invalid, and the terminal device may display the interface as shown in FIG. 5G.

It may be understood that the second preset duration may be duration set in advance, or may be set by the user according to own needs. Second preset duration corresponding to records generated during jumping between different clone applications may be the same or different. The first preset duration is not limited in this embodiment of this application. The second preset duration may be equal to, or may not be equal to the first preset duration. The second preset duration is not limited in this embodiment of this application.

For example, the user may tap a chat window in the interface as shown in FIG. 6C. The terminal device may share content of the clone of application A to a corresponding chat window according to a tap operation of the user. Refer to the interface shown in FIG. 4D to FIG. 4F or the interfaces shown in FIG. 5D to FIG. 5F. Details are not described in this embodiment of this application again.

For example, when displaying the interface as shown in FIG. 6C, the terminal device may further generate a new record of jumping from the clone of application A to the clone of application B. Further, after sharing the content of the clone of application A to the clone of application B, when returning to the clone of application A, the terminal device may obtain the new record of jumping from the clone of application A to the clone of application B, and determine whether the new record is valid. If the new record is valid, the terminal device does not need to display the interface as shown in FIG. 4G. If the new record is invalid, the terminal device needs to display the interface as shown in FIG. 4G.

In this way, when the terminal device opens the interface of the second application clone via the interface of the first application clone, if the record of jumping from the clone of application A to the clone of application B is valid, the user does not need to select the icon of the second application and the icon of the second application clone. A user's operation process of content sharing on the terminal device is simplified to save time during the content sharing, so that user experience is improved.

In a possible implementation, the application clone-based interface display method provided in this embodiment of this application may alternatively be applied to a payment scenario. FIG. 7 is a schematic diagram of a payment scenario according to an embodiment of this application.

Figure 7A:
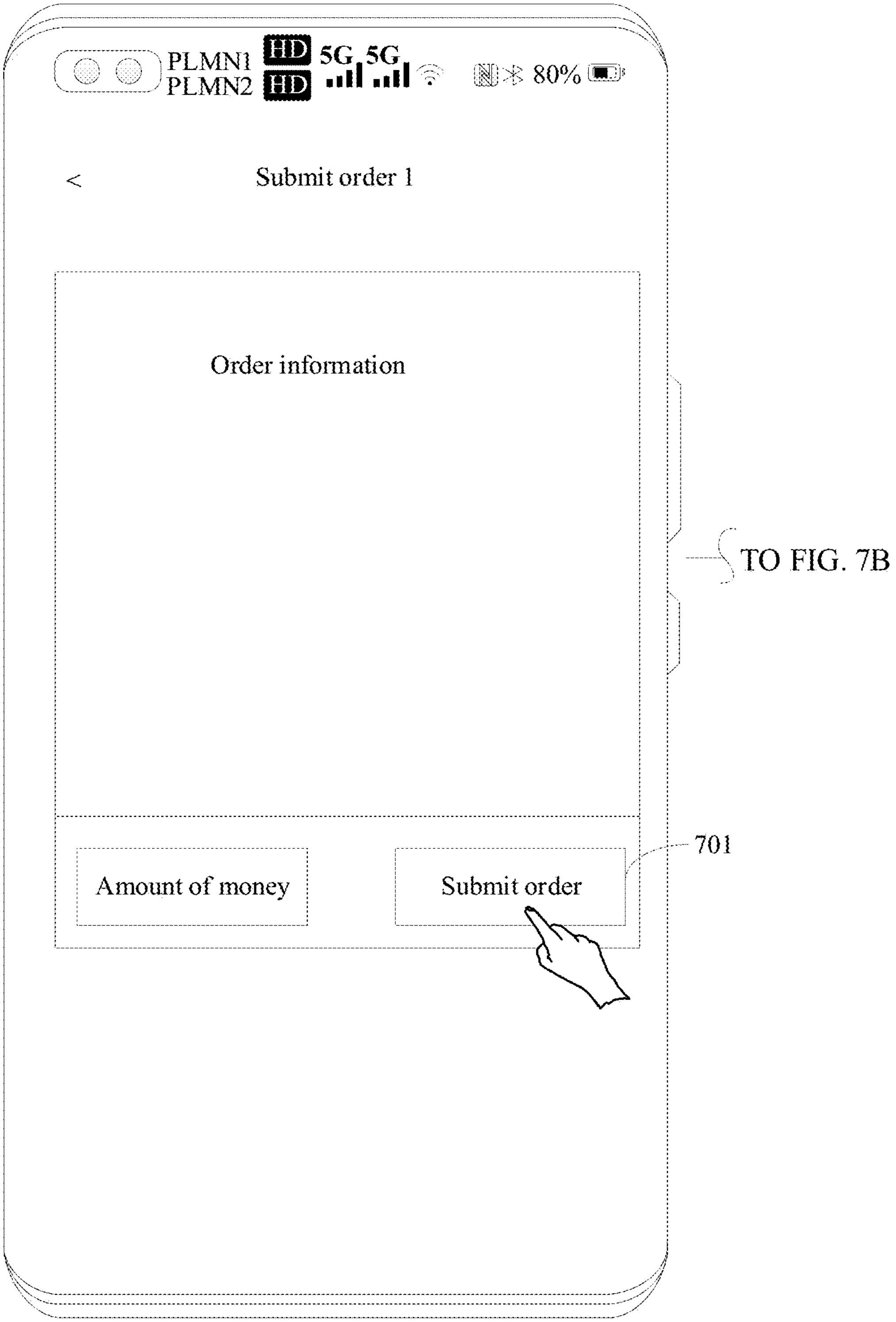
FIG. 7 is a schematic diagram of a payment scenario according to an embodiment of this application.

For example, an interface shown in FIG. 7A may be an interface of a clone of application D. The interface may include information of order 1, an amount of money of order 1, and a control 701 for submitting an order. In the interface as shown in FIG. 7A, the user may tap the control 701 for submitting an order. A terminal device may receive a tap operation of a user for the control 701 for submitting an order, and in response to the tap operation, display an interface as shown in FIG. 7B.

Figure 7B:
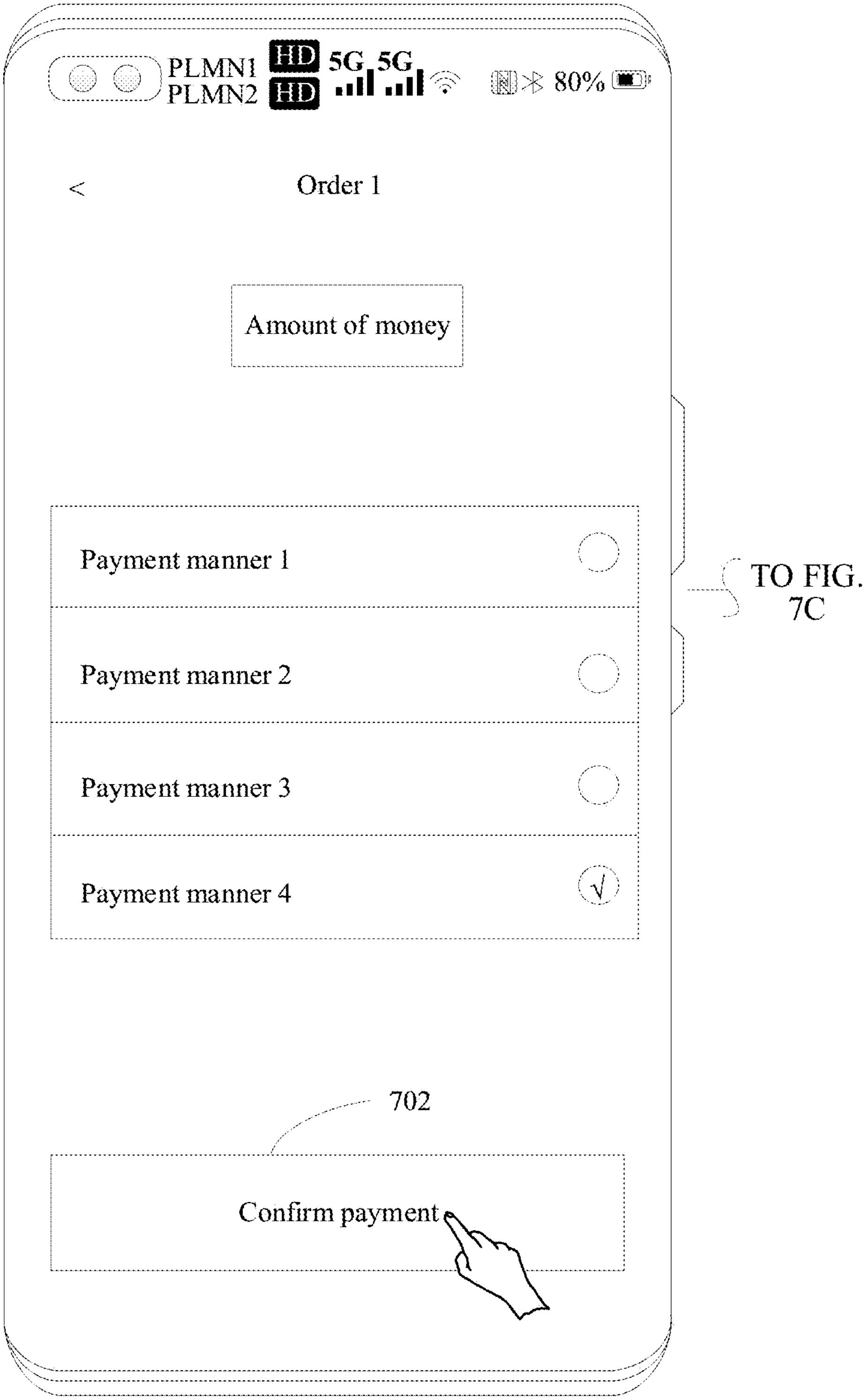

The interface as shown in FIG. 7B may include the amount of money of order 1, a plurality of payment manners, and a control 702 for confirming payment. The plurality of payment manners may include payment manner 1, payment manner 2, payment manner 3, and payment manner 4. The user may select from the plurality of payment manners based on own needs. In the interface as shown in FIG. 7B, payment manner 4 is selected.

Figure 7C:
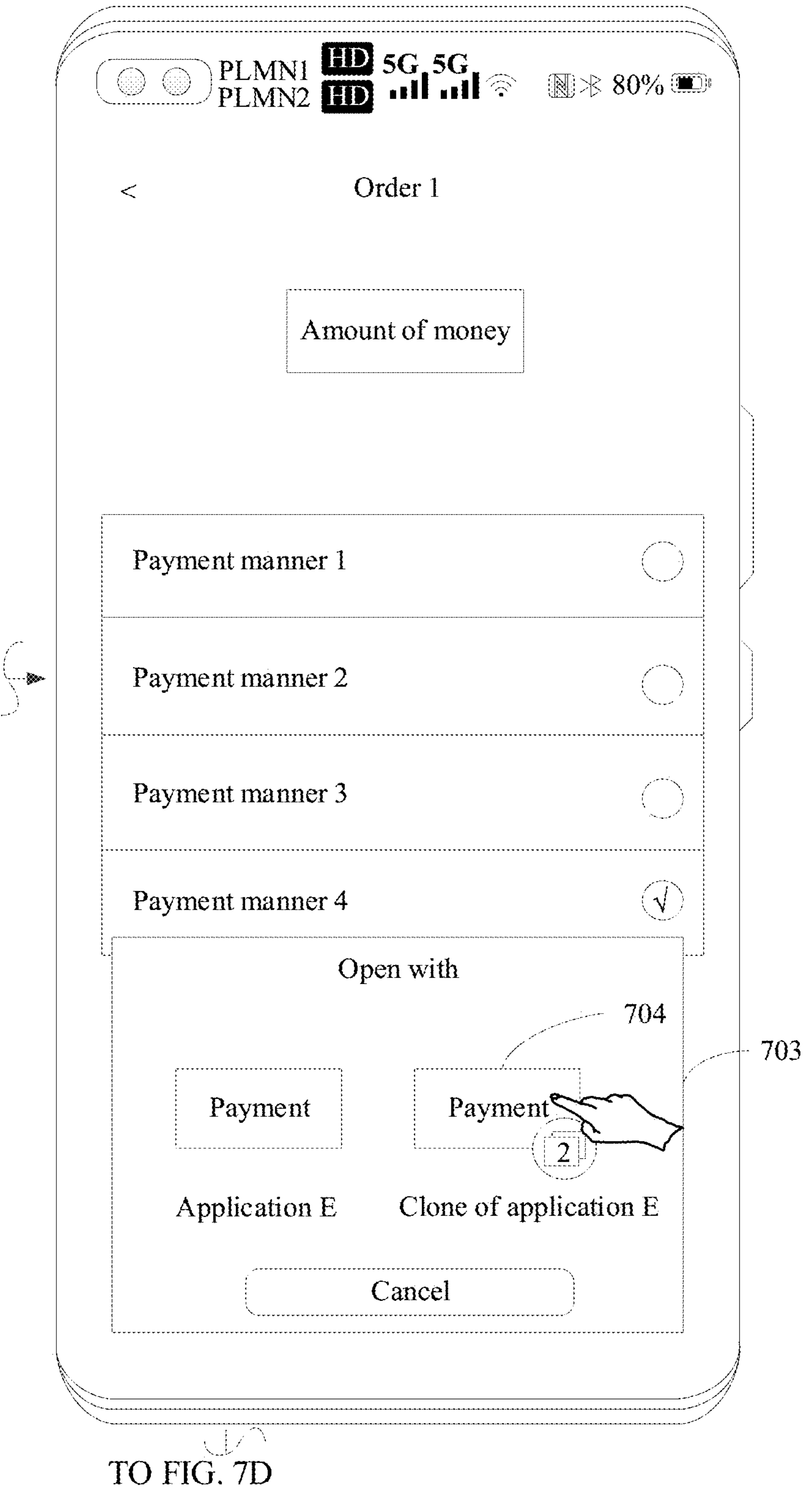

In the interface as shown in FIG. 7B, the user may tap the control 702 for confirming payment. The terminal device may receive a tap operation of the user for the control 702 for confirming payment, and in response to the tap operation, display an interface as shown in FIG. 7C.

It may be understood that an application corresponding to payment manner 4 is application E. Application E may have a clone application. Therefore, the interface as shown in FIG. 7C may include part of content in the interface as shown in FIG. 7B, and an opening manner selection bar 703. The opening manner selection bar 703 may include an icon of application E and an icon 704 of the clone of application E.

The opening manner selection bar 703 may be displayed in a form of floating window, or may be displayed in a form of split-screen or card. A size of the opening manner selection bar 703 may be smaller than or equal to a screen size of the terminal device. A specific display form and interface size of the opening manner selection bar 703 are not limited in this embodiment of this application.

The opening manner selection bar 703 may be displayed at a lower part of a screen of the terminal device, or may be displayed at an upper part or a side of a screen of the terminal device. A specific display form and display position of the opening manner selection bar 703 are not limited in this embodiment of this application.

Figure 7D:
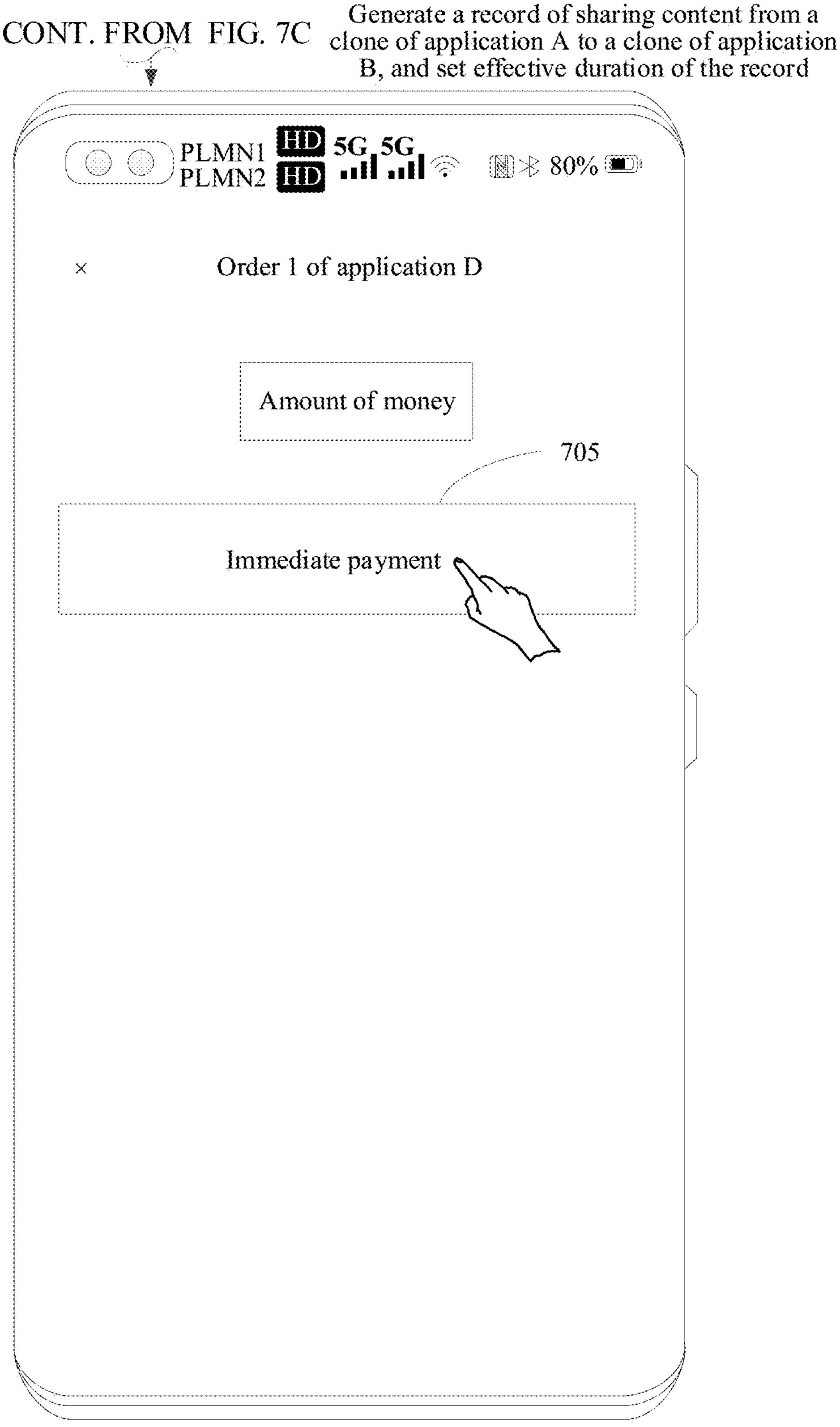

In the interface as shown in FIG. 7C, the user may tap the icon 704 of the clone of application E. The terminal device may receive a tap operation of the user for the icon 704 of the clone of application E, and in response to the tap operation, display an interface as shown in FIG. 7D. When displaying the interface as shown in FIG. 7D, the terminal device may further generate a record of jumping from the clone of application D to the clone of application E.

The interface as shown in FIG. 7D may be an interface of the clone of application E. The interface may include an amount of money of order 1 and a control 705 for immediate payment.

In the interface as shown in FIG. 7D, the user may tap the control 705 for immediate payment. The terminal device may receive a tap operation of the user for the control 705 for immediate payment, and in response to the tap operation, display an interface as shown in FIG. 7E.

Figure 7E:
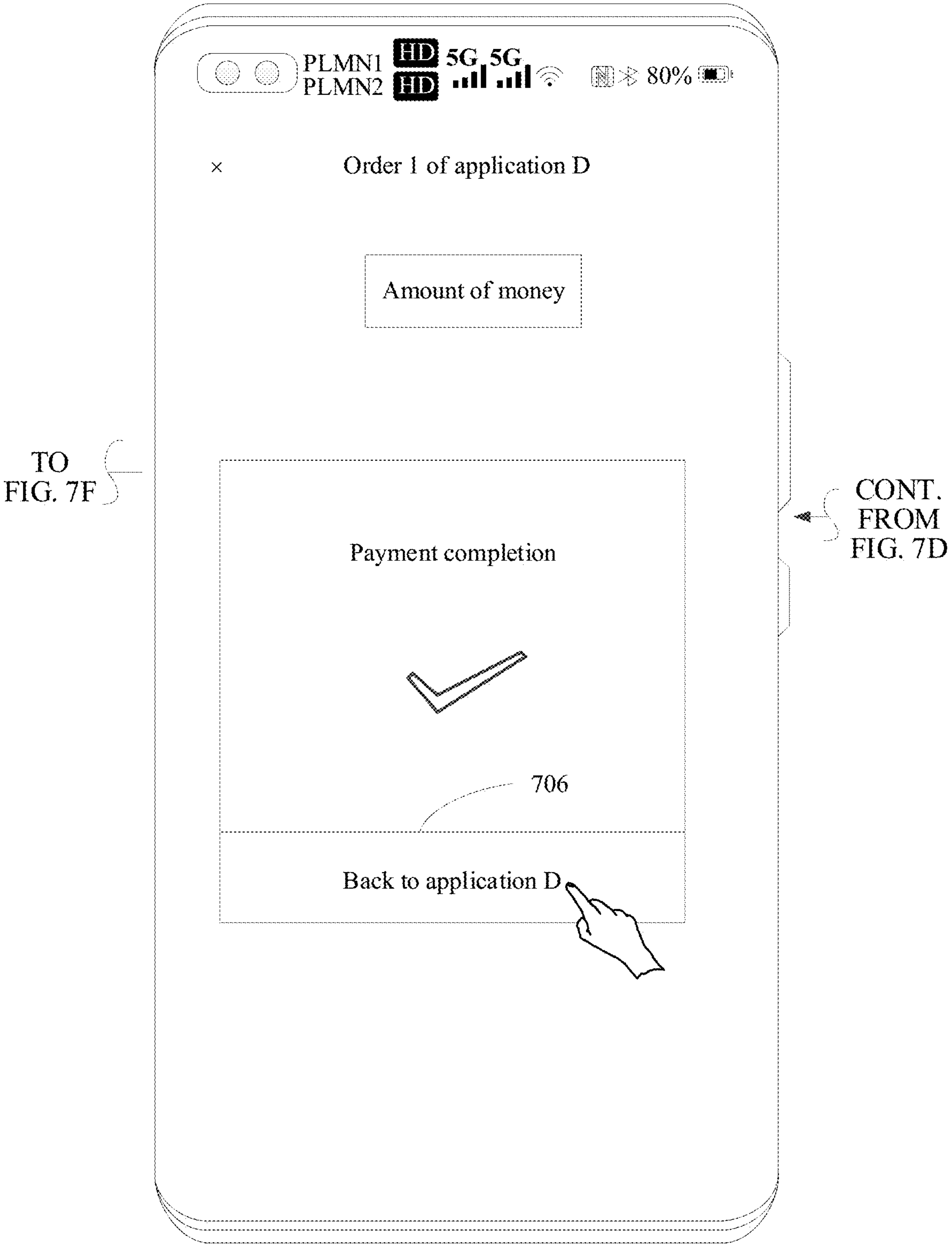

The interface as shown in FIG. 7E may include the amount of money of order 1, prompt information for prompting payment completion, and a control 706 for returning to application D.

Figure 7F:
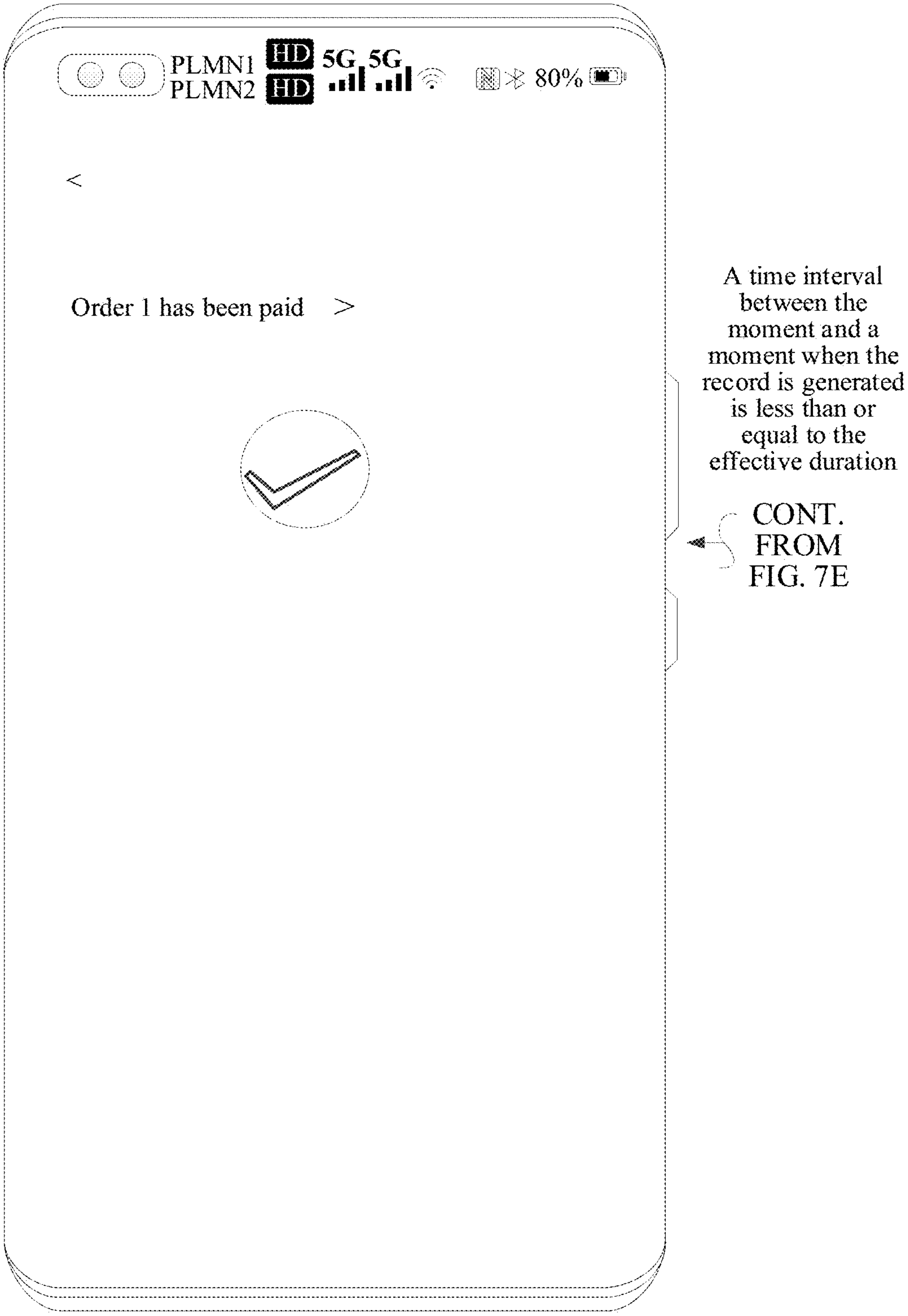

In the interface as shown in FIG. 7E, the user may tap the control 706 for returning to application D. The terminal device may receive a tap operation of the user for the control 706 for returning to application D, and in response to the tap operation, obtain the record of jumping from the clone of application D to the clone of application E. The terminal device may determine whether the record of jumping from the clone of application D to the clone of application E is valid. If the record is valid, the terminal device may display an interface as shown in FIG. 7F. The interface shown in FIG. 7F is the interface of the clone of application D.

For example, the terminal device may determine a time interval between a moment of receiving the tap operation of the user for the icon 704 of the clone of application E and a moment of receiving the tap operation of the user for the control 706 for returning to application D. If the time interval is less than or equal to first preset duration, the terminal device determines that the record of jumping from the clone of application D to the clone of application E is valid.

In a possible implementation, if the time interval is greater than the first preset duration, the terminal device determines that the record of jumping from the clone of application D to the clone of application E is invalid. The terminal device may display an interface including a return manner selection bar. The return manner selection bar may include an interface of an icon of application D and an icon of the clone of application D. The interface is similar to the return manner selection bar 411 in the foregoing interface shown in FIG. 4G. Details are not described in this embodiment of this application again.

In view of this, in a payment process, after the payment is completed, the user does not need to select between the icon of application D and the icon of the clone of application D. An operation process of the user is simplified to save time during payment, so that user experience is improved.

In the payment scenario, to further simplify the operation of the user, when the terminal device returns to the clone of application D and the terminal device starts the clone of application E again via the clone of application D, the user does not need to select between the icon of application E and the icon of the clone of application E. FIG. 8 is a schematic diagram of an interface of another payment scenario according to an embodiment of this application.

Figure 8A:
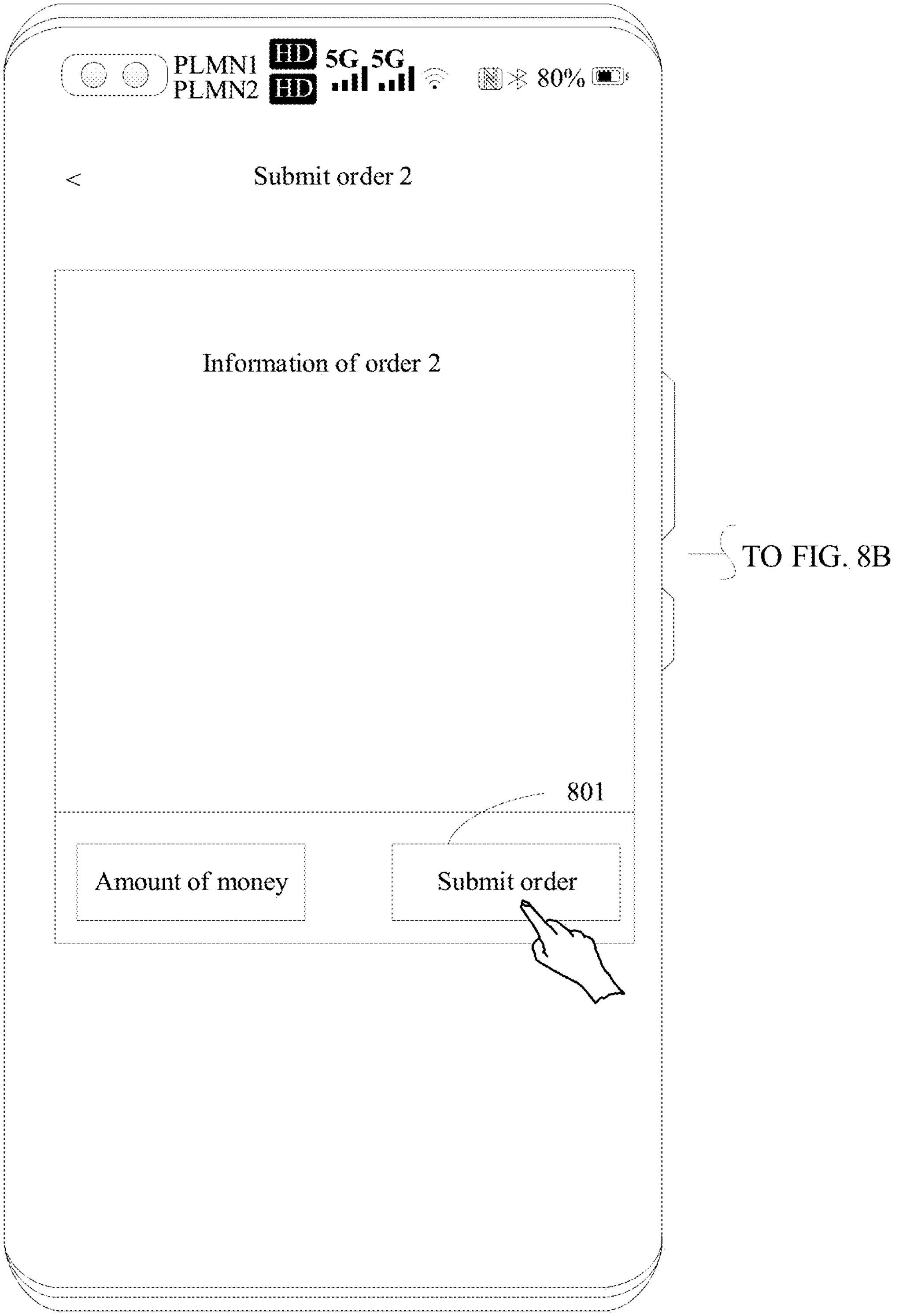
FIG. 8 is a schematic diagram of an interface of another payment scenario according to an embodiment of this application.

For example, an interface as shown in FIG. 8A may be an interface of order 2 generated in the clone of application D after a terminal device displays the interface shown in FIG. 7F. The interface may include information of order 2, an amount of money of order 2, and a control 801 for submitting an order.

In the interface as shown in FIG. 8A, a user may tap the control 801 for submitting an order. The terminal device may receive a tap operation of the user for the control 801 for submitting an order, and in response to the tap operation, display an interface as shown in FIG. 8B.

The interface as shown in FIG. 7B may include the amount of money of order 2, a plurality of payment manners, and a control 802 for confirming payment. The plurality of payment manners may include payment manner 1, payment manner 2, payment manner 3, and payment manner 4. The user may select from the plurality of payment manners based on own needs. In the interface as shown in FIG. 8B, payment manner 4 is selected.

Figure 8B:
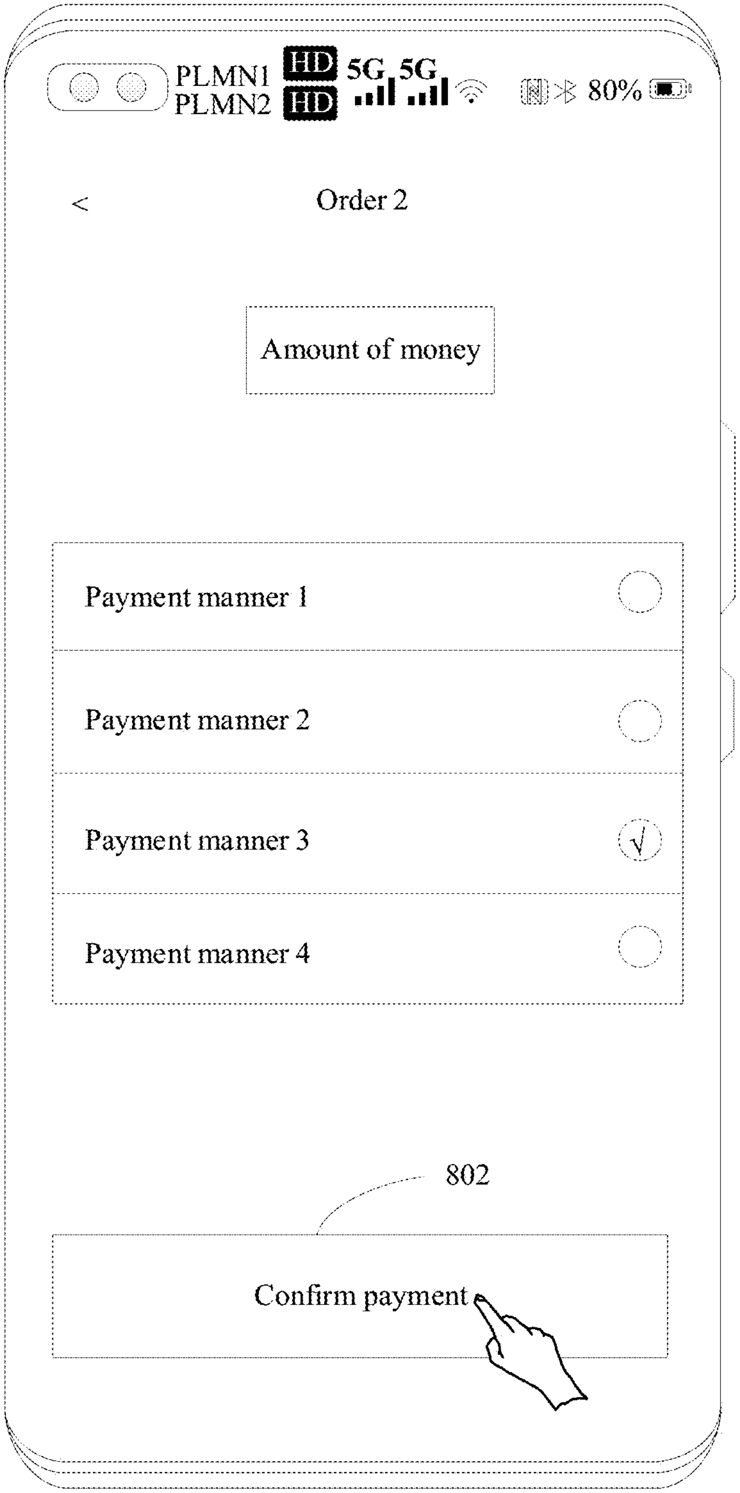
Figure 8C:
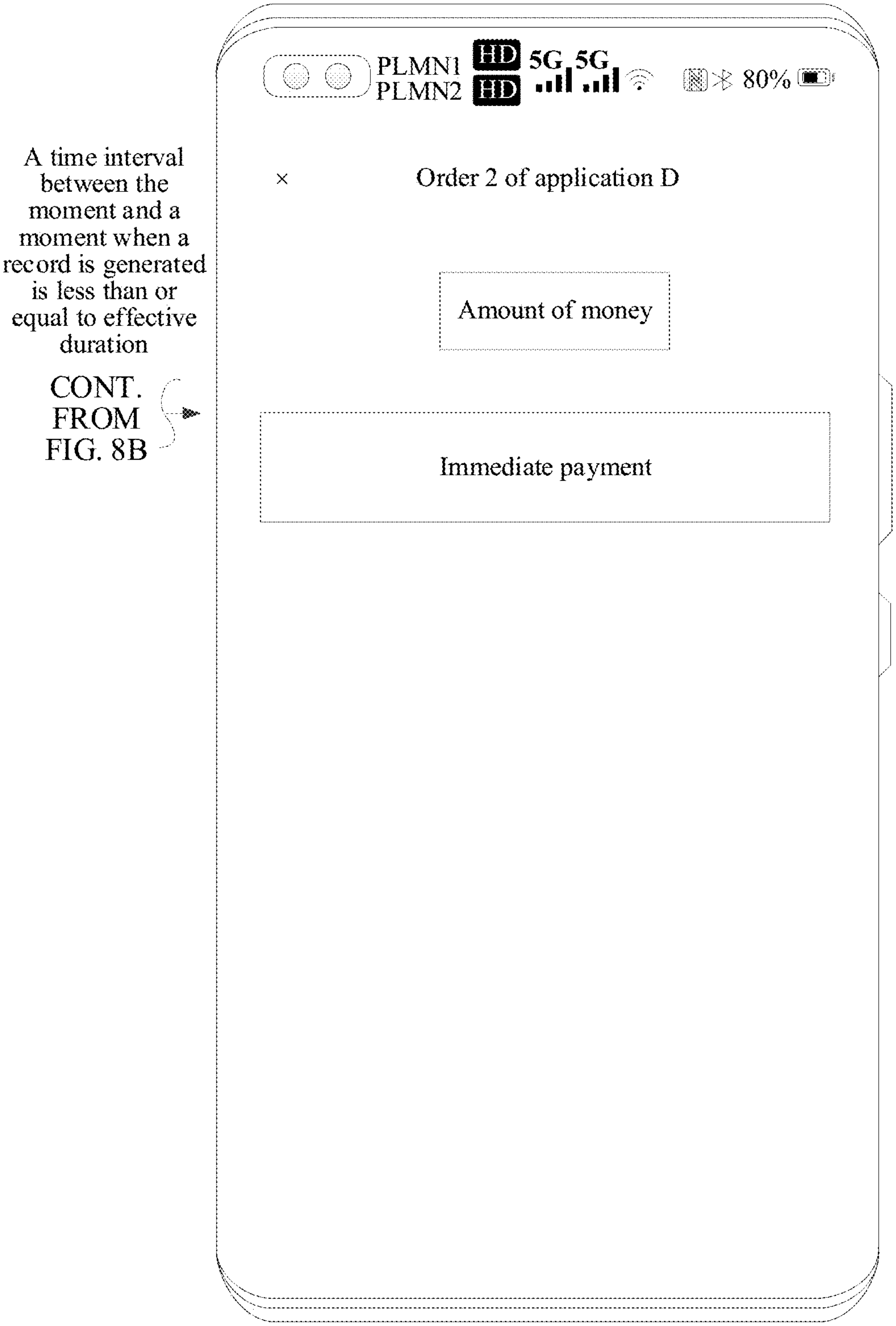

In the interface as shown in FIG. 8B, the user may tap the control 802 for confirming payment. The terminal device may receive a tap operation of the user for the control 802 for confirming payment, and in response to the tap operation, obtain a record of jumping from a clone of application D to a clone of application E. The terminal device may determine whether the record is valid. If the record is valid, the terminal device may display an interface as shown in FIG. 8C. The interface shown in FIG. 8C is an interface of the clone of application E.

For example, the terminal device may determine a time interval between a moment of receiving the tap operation of the user for the icon 704 of the clone of application E and a moment of receiving the tap operation of the user for the control 802 for confirming payment. If the time interval is less than or equal to second preset duration, the terminal device determines that the record of jumping from the clone of application D to the clone of application E is valid.

In a possible implementation, if the time interval is greater than the second preset duration, the terminal device determines that the record of jumping from the clone of application D to the clone of application E is invalid. When the record of jumping from the clone of application D to the clone of application E is invalid, the terminal device may display the interface including the icon of application E and the icon of the clone of application E as shown in FIG. 7C.

For example, the user may tap a control for immediate payment as shown in FIG. 8C. The terminal device may display interfaces similar to the interfaces as shown in FIG. 7D to FIG. 7F according to a tap operation of the user. Details are not described in this embodiment of this application again.

For example, when displaying the interface as shown in FIG. 8C, the terminal device may further generate a new record of jumping from the clone of application D to the clone of application E. Further, after completing the payment of order 2 by using the clone of application E, when returning to the clone of application A, the terminal device may obtain the new record of jumping from the clone of application D to the clone of application E, and determine whether the new record is valid. If the record is valid, the terminal device may display the interface of the clone of application D.

In this way, when the user pays for the order in the application D via application E within the second preset duration, the user does not need to select between the icon of application E and the icon of the clone of application E. An operation of selecting an application for payment in the payment scenario is further simplified to save time during payment, so that user experience is improved.

Figure 9:
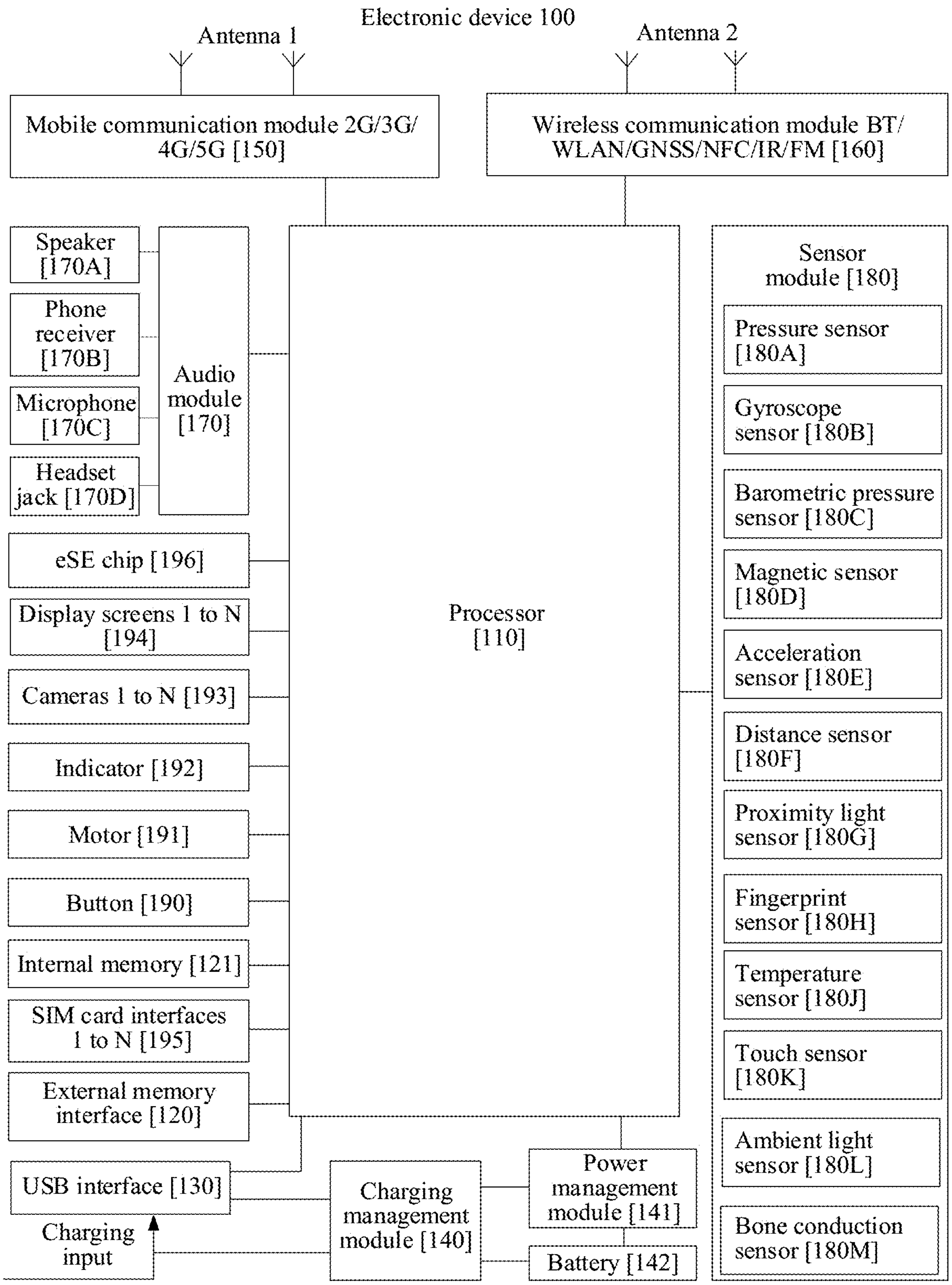
FIG. 9 is a schematic diagram of a structure of an electronic device according to an embodiment of this application.

For example, FIG. 9 is a schematic diagram of a structure of an electronic device.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the electronic device. In some other embodiments of this application, the electronic device may include more or fewer components than those shown in the figure, some components may be combined, some components may be split, or different arrangements may be used. The components in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be separate devices, or may be integrated into one or more processors.

The controller may generate an operation control signal based on an instruction operation code and a timing signal, to control instruction fetching and instruction execution.

A memory may be further disposed in the processor 110 and is configured to store instructions and data. In some embodiments, the memory in the processor 110 is a cache. The memory may store instructions or data recently used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In some embodiments, the processor 110 may include one or more interfaces. The interface may include an inter-integrated circuit (Inter-integrated Circuit, I2C) interface, an inter-integrated circuit sound (Inter-integrated Circuit Sound, I2S) interface, a pulse code modulation (Pulse Code Modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules illustrated in this embodiment of the present invention is merely an example for descriptions, and does not constitute a limitation on a structure of the electronic device. In some other embodiments of this application, the electronic device may alternatively use an interface connection manner different from that in the foregoing embodiment, or use a combination of a plurality of interface connection manners.

The electronic device implements a display function through the GPU, the display screen 194, the application processor, and the like. The GPU is a microprocessor for image processing and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device 100 may include 1 or N display screens 194. N is a positive integer greater than 1. In this embodiment of this application, the display screen 194 may be configured to display an interface in this application, for example, an interface of a first application clone, an interface of a second application clone, and the like.

The electronic device may implement a photographing function by using the ISP, the camera 193, the video codec, the GPU, the display screen 194, the application processor, and the like.

The electronic device 100 may implement an audio function such as music playing or recording by using the audio module 170, the speaker 170A, the phone receiver 170B, the microphone 170C, the headset jack 170D, the application processor, and the like.

The touch sensor 180K is also referred to as a "touch device". The touch sensor 180K may be disposed on the display screen 194. The touch sensor 180K and the display screen 194 form a touchscreen, also referred to as a "touch control screen". The touch sensor 180K is configured to detect a touch operation performed on or near the touch sensor 180K. The touch sensor may transfer the detected touch operation to the application processor to determine a type of a touch event. Visual output related to the touch operation may be provided by the display screen 194. In some other embodiments, the touch sensor 180K may be alternatively disposed on a surface of the electronic device 100 in a position different from that of the display screen 194. In this embodiment of this application, the touch sensor 180K may be configured to detect a tap operation of the user on an icon or a control in the interface.

Figure 10:
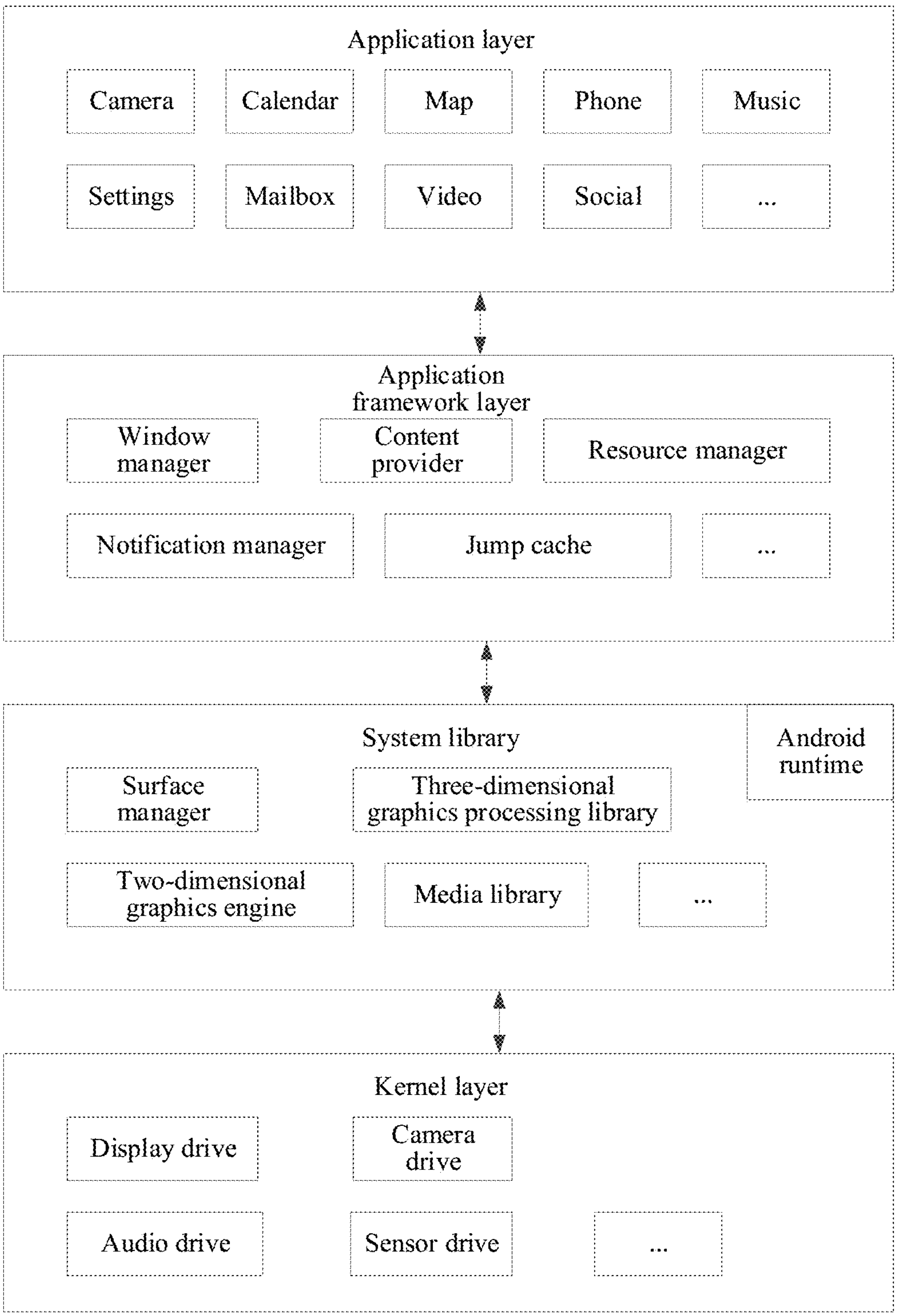
FIG. 10 is a block diagram of a software structure of a terminal device according to an embodiment of this application.

FIG. 10 is a block diagram of a software structure of a terminal device according to an embodiment of this application.

In a layered architecture, software is divided into several layers, and each layer has a clear role and task. The layers communicate with each other through software interfaces. In some embodiments, the Android system is divided into four layers that are respectively an application layer, an application framework layer, an Android runtime (Android runtime) and system library, and a kernel layer from top to bottom.

The application layer may include a series of application packages.

As shown in FIG. 10, the application packages may include applications such as camera, calendar, phone, map, game, music, settings, email, video, and social. The application layer may include a first application, a first clone application, a second application, a second clone application, and the like. In this embodiment of this application, display of the interface and an interface interaction of the user may be implemented at the application layer.

The application framework layer provides an application programming interface (application programming interface, API) and a programming framework for applications at the application layer. The application framework layer includes some predefined functions.

As shown in FIG. 10, the application framework layer may include a window manager, a content provider, a resource manager, a notification manager, a jump cache, and the like. In this embodiment of this application, the jump cache in the application framework layer may generate a jump record between applications. For example, when the terminal device displays the interface shown in FIG. 5D, the jump cache generates a jump record from a clone of application A to a clone of application B.

The window manager is configured to manage a window application. The window manager may obtain a size of a display screen, determine whether there is a status bar, perform screen locking, perform screen touching, perform screen dragging, perform screen capturing, and the like. In this embodiment of this application, the window manager may be configured to implement operations related to interface display.

The resource manager provides various resources for an application program, such as a localized character string, an icon, an image, a layout file, and a video file.

The notification manager enables an application to display notification information in the status bar. The notification information may be used for conveying an informative message that may disappear automatically after a short period of time without user interaction.

The Android runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, for example, a surface manager (surface manager), media libraries (Media Libraries), a three-dimensional graphics processing library, and a two-dimensional graphics engine.

The surface manager is configured to manage a display subsystem and provide fusion of 2D and 3D layers for a plurality of applications.

The media library supports playback and recording of a plurality of commonly used audio and video formats, and static image files. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, compositing, layer processing, and the like.

The two-dimensional graphics engine is a drawing engine for two-dimensional drawings.

The graphics compositing is used for compositing one or more rendered views into a display interface.

The kernel layer is a layer between hardware and software. The kernel layer may include a display drive, a camera drive, an audio drive, a central processing unit drive, and the like.

Figure 11:
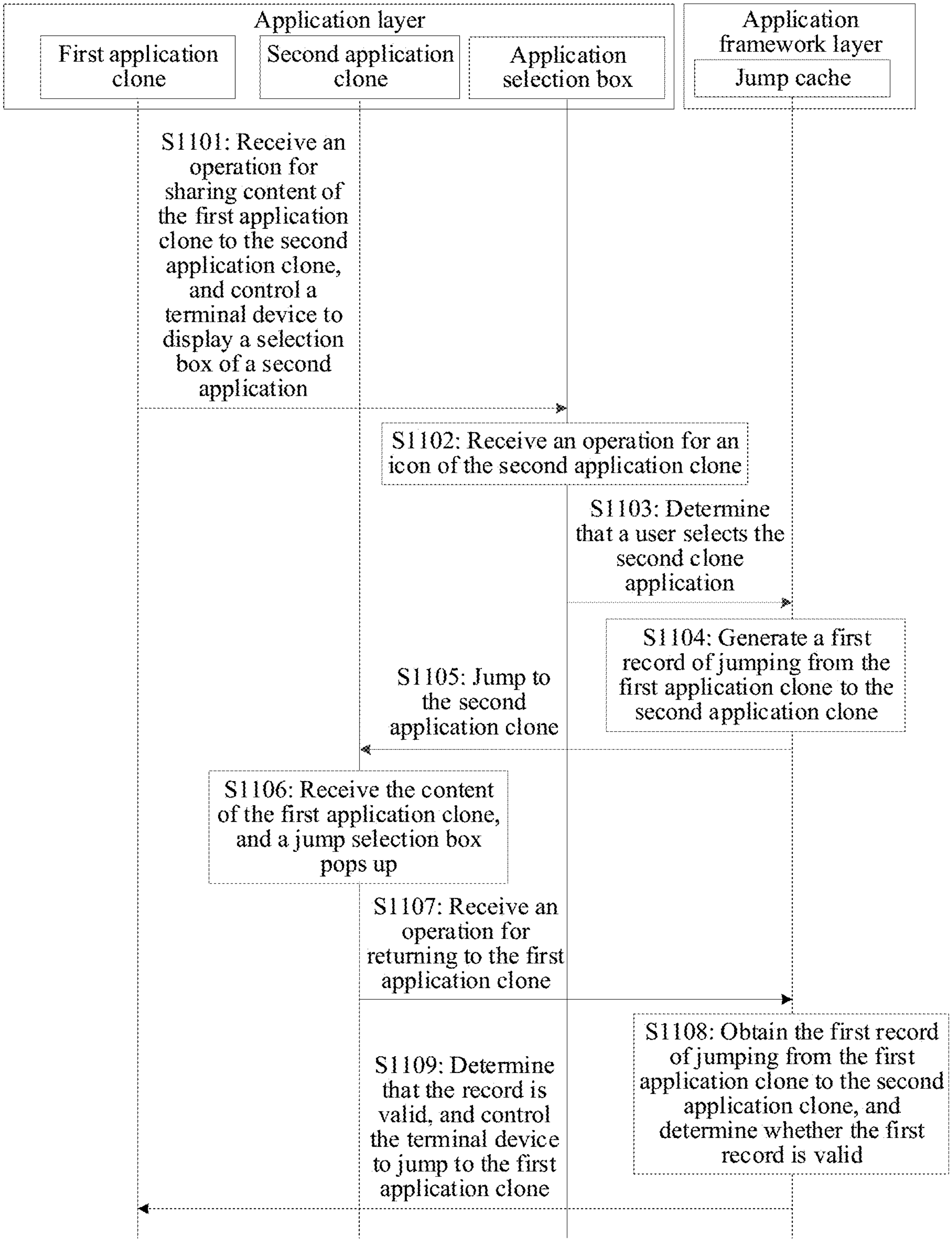
FIG. 11 is a schematic flowchart of an application clone-based interface display method according to an embodiment of this application.

For example, FIG. 11 is a schematic flowchart of an application clone-based interface display method according to an embodiment of this application. As shown in FIG. 11, the application clone-based interface display method may include the following steps.

S1101: When receiving an operation for sharing content of a first application clone to a second application clone, the first application clone controls a terminal device to display a selection box of a second application.

For example, for the receiving, by the first application clone, the operation for sharing the content of the first application clone to the second application clone, refer to the interfaces shown in FIG. 5A and FIG. 5B or the interfaces shown in FIG. 6A and FIG. 6B. Details are not described in this embodiment of this application again.

An application selection box may assist the terminal device to display the selection box of the second application. The selection box of the second application may include an icon of the first application and an icon of the second application clone, for example, the opening manner selection bar 404 in the interface shown in FIG. 5. Details are not described in this embodiment of this application again.

S1102: The application selection box receives an operation for the icon of the second application clone.

For example, the operation of the user for the icon of the second application clone is similar to the operation of the user to tap the icon of the clone of application B in the interface shown in FIG. 5C. Details are not described in this embodiment of this application again.

S1103: A jump cache module determines that the user selects the second clone application.

For example, when the user selects the second application clone in the selection box of the second application, the jump cache module may determine that the user selects the second clone application.

When receiving an operation of the user for the icon of the second application clone, the jump cache module generates a first record of jumping from the first application clone to the second application clone and jumping to the second application clone is performed.

In this embodiment of this application, the jump cache module may be configured to generate and buffer a jump record between applications.

S1104: The jump cache module generates the first record of jumping from the first application clone to the second application clone.

S1105: The jump cache module controls the terminal device to jump to the second application clone.

S1106: The second application clone receives the content of the first application clone, and a jump selection box pops up.

For example, the content of the first application clone may be multimedia information. For example, as shown in FIG. 5, the chat window in the second application clone receives the multimedia information of the first application clone. The content of the first application clone may alternatively be payment information. For example, as shown in FIG. 7, the second application clone may receive the payment information of the first application clone, and the user may complete payment on the interface of the second application clone.

In this embodiment of this application, the jump selection box may include a control for returning to the first application and a control for staying in the second application. The jump selection box is similar to the prompt bar 409 in the interface shown in FIG. 5F. Details are not described in this embodiment of this application. In a payment scenario, the jump selection box may be the space 706 for returning to application D in the interface shown in FIG. 7E.

S1107: The jump cache module receives an operation for returning to the first application clone.

For example, the operation of returning to the first clone is similar to the operation of the user to tap the control 410 for returning to application A in the interface shown in FIG. 5F. Details are not described in this embodiment of this application again.

S1108: The jump cache module obtains the first record of jumping from the first application clone to the second application clone, and determines whether the first record is valid.

For example, for a method for determining whether the first record is valid, refer to the foregoing embodiments. Details are not described again in this embodiment of this application.

S1109: When determining that the first record is valid, the jump cache module controls the terminal device to jump to the first application clone.

For example, when jumping to the first application clone, the terminal device may display the interface of the first application clone.

In this way, when sharing the content of the first application clone to the second application clone, the terminal device may return to the first application clone according to the operation that the user selects to return to the first application clone, and the user does not need to select between the icon of the first application and the icon of the first application clone. An operation process of content sharing is simplified, so that user experience is improved.

In a possible implementation, when the first application and the second application each have a clone, the user wants to share the content of the first application clone to the second application, the user wants to share content of the first application to the second application, or the user wants to share the content of the first application to the second application clone. The displayed interfaces are similar to the interfaces shown in FIG. 5 and FIG. 6. Details are not be described in this embodiment of this application again.

For example, the first application is application A and the second application is application B. Different from FIG. 5, when the user wants to share video A of the clone of application A to application B, when the terminal device displays the interface shown in FIG. 5C, the user may tap the icon of application B in the opening manner selection bar 404 in the interface, and the terminal device receives the tap operation of the user for the icon of application B, and in response to the operation, displays the interface of application B.

In a possible implementation, it is assumed that the first application has a clone application, and the second application does not have a clone application. An example in which the first application is application A and the second application is application B is used. Different from FIG. 5, when the user wants to share the content of the clone of application A to application B, when the terminal device receives the tap operation of the user for the icon of application B in the interface as shown in FIG. 5B, the terminal device displays the interface of application B. Other interfaces are similar to the interfaces shown in FIG. 5. Details are not described in this embodiment of this application again.

In a possible implementation, it is assumed that the first application does not have a clone application, and the second application has a clone application. An example in which the first application is application A and the second application is application B is used. Different from FIG. 5, when the user wants to share the content of the clone of application A to application B, in the interface as shown in FIG. 5F, the user may tap the control 410 for returning to application A. The terminal device may receive the tap operation of the user for the control 410 for returning to application A. In response to the tap operation, the terminal device returns to application A, displays the interface as shown in FIG. 5A, and does not need to obtain a jump record between applications. Further, after returning to application A, when the user wants to share the content to the clone of application B again, the terminal device displays interfaces that are similar to that in FIG. 6. Details are not described in this embodiment of this application again.

Figure 12:
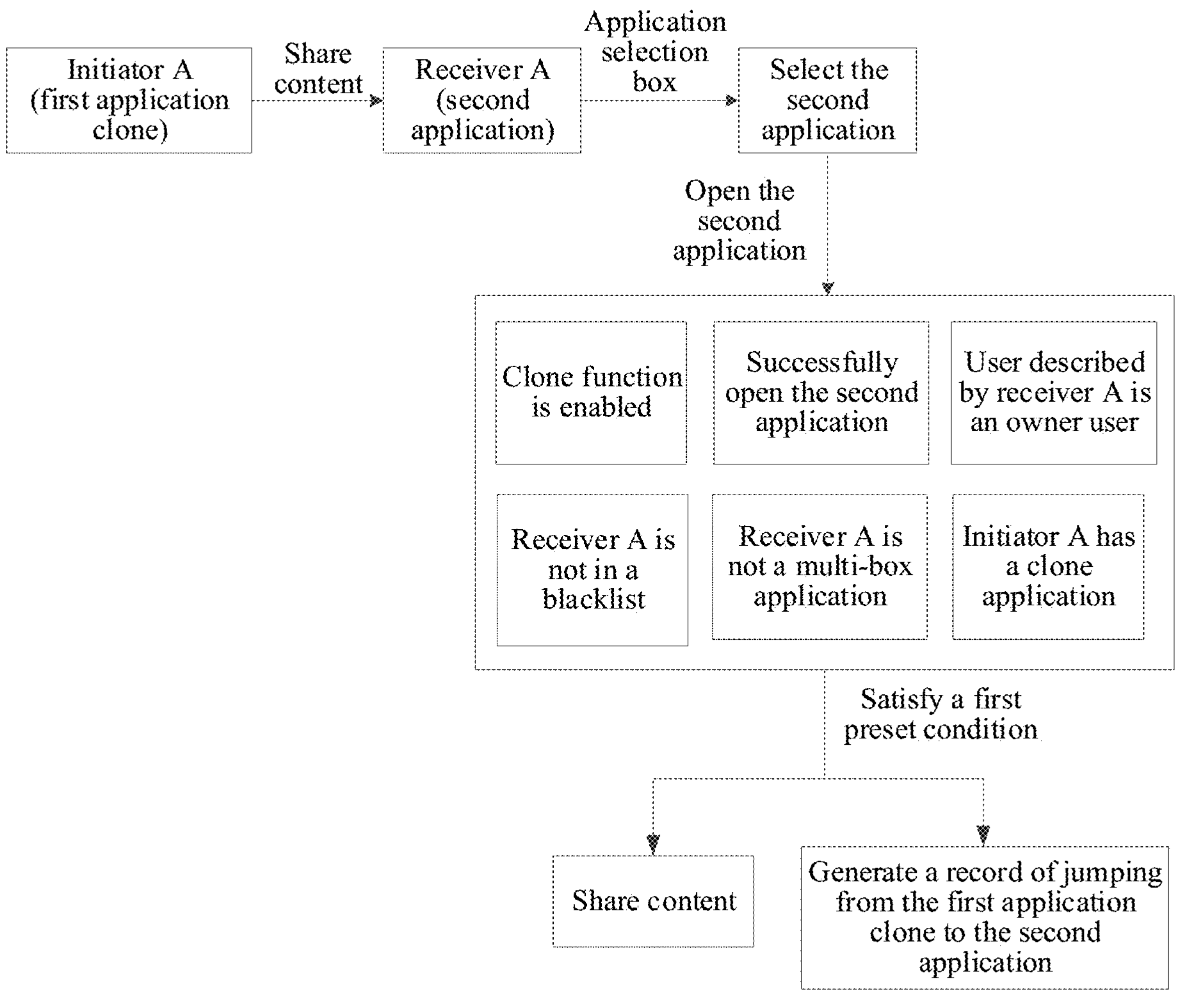
FIG. 12 is a schematic flowchart of a method for generating a record of jumping from a first application clone to a second application according to an embodiment of this application.

For example, the first application and the second application each have a clone. When the user wants to share the content of the first application clone to the second application, for a method for the terminal device to generate a record of jumping from the first application clone to the second application, refer to FIG. 12. FIG. 12 is a schematic flowchart of a method for generating a record of jumping from a first application clone to a second application according to an embodiment of this application.

As shown in FIG. 12, initiator A is the first application clone, and receiver A is the second application. When a user wants to share content in initiator A to receiver A, a terminal device may determine that the user selects receiver A as the second application by using an application selection box, and the terminal device opens the second application according to the selection of the user, and determines whether a first preset condition is satisfied. If it is determined that the first preset condition is satisfied, the terminal device may share the content of the first application clone to the second application and generate the record of jumping from the first application clone to the second application.

For example, the first preset condition may include that a clone function of the application in the terminal device is enabled, the terminal device successfully opens the second application, the user to which receiver A belongs is an owner user, receiver A is not in a blacklist, receiver A is not a multi-box application, and initiator A has a clone application.

The user may enable the clone function of the application via the interface as shown in FIG. 1, so that the clone function of the application is enabled. A blacklist application may be an application that does not use the interface display method provided in this embodiment of this application. The multi-box application may be the opening manner selection bar in the interface as shown in FIG. 5C. If the user taps on a blank area in an area where the opening manner selection bar is located, the terminal device may determine that receiver A is the the multi-box application.

In a possible implementation, when determining whether the foregoing first preset condition is satisfied, the terminal device may determine a next condition if a previous condition is satisfied in sequence. For example, after it is determined that the clone function of the application in the terminal device is enabled, it is determined whether the terminal device successfully opens the second application. In this way, when a condition is not satisfied, it is determined that the first preset condition is not satisfied, and it is not necessary to determine whether a remaining condition is satisfied. This can save time required for the terminal device to determine whether the first preset condition is satisfied.

In another possible implementation, the terminal device may simultaneously determine whether the foregoing conditions are satisfied. If one of the conditions is not satisfied, the terminal device may determine that the first preset condition is not satisfied.

For example, the record of jumping from the first application clone to the second application generated by the terminal device has effective duration, and the effective duration may be first preset duration.

In view of this, when the first application clone shares the content to the second application, the record of jumping from the first application clone to the second application may be generated, so that the terminal device returns to the first application clone from the second application based on the record.

Figure 13:
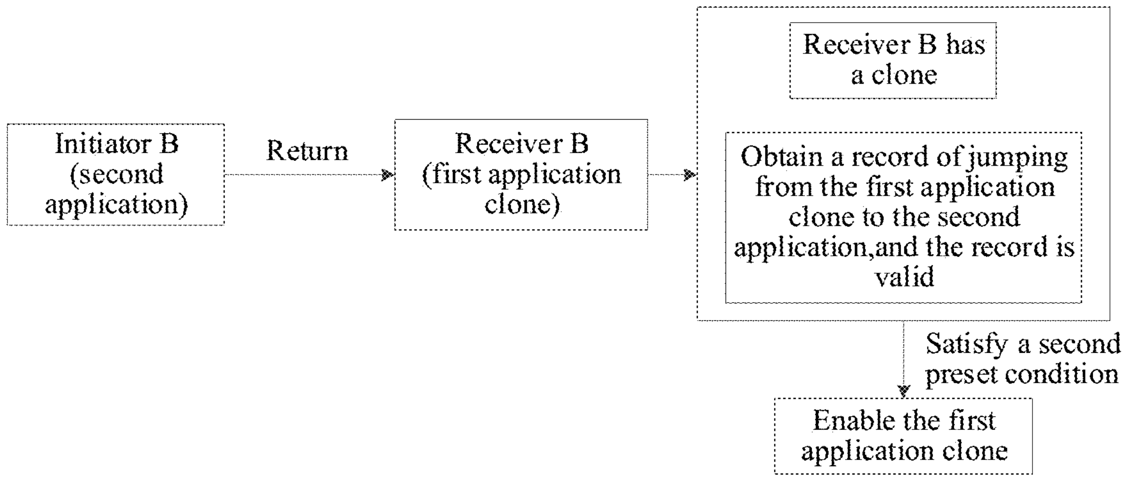
FIG. 13 is a schematic flowchart of a method for jumping back from a second application to a second application clone according to an embodiment of this application.

For example, when the terminal device shares the first application clone to the second application and returns to the first application clone, the terminal device may determine that the record of jumping from the first application clone to the second application is valid, and for a method of jumping back to the first application clone, refer to FIG. 13. FIG. 13 is a schematic flowchart of a method for jumping back from a second application to a second application clone according to an embodiment of this application.

As shown in FIG. 13, when a terminal device shares a first application clone to the second application and returns to a first application clone, initiator B is the second application and receiver B is the first application clone. The terminal device may determine whether a second preset condition is satisfied. When the second preset condition is satisfied, the terminal device may determine that receiver B is the first application clone based on a record of jumping from the first application clone to the second application, start the first application clone, and display an interface of the first application clone.

For example, the second preset condition may include that receiver B has a clone, the record of jumping from the first application clone to the second application is obtained, and the record is a valid record.

For the method for determining whether the record of jumping from the first application clone to the second application is valid, refer to the foregoing embodiments. Details are not described in this embodiment of this application.

In view of this, when the record of jumping from the first application clone to the second application is valid, the terminal device may start the first application clone and display the interface of the first application clone. An operation flow of returning from the second application to the first application clone is simplified, so that user experience is improved.

The foregoing mainly describes solutions according to embodiments of this application from a method perspective. To implement the foregoing functions, corresponding hardware structures and/or software modules for performing the functions are included. A person skilled in the art needs to be easily aware that the method steps in the examples described with reference to embodiments disclosed in this specification may be implemented in this application in a form of hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In embodiments of this application, an apparatus for implementing an application clone-based interface display method may be divided into functional modules based on the foregoing method examples, for example, each functional module may be obtained through division for each corresponding function, or two or more functions may be integrated into one processing module. The integrated module may be implemented in the form of hardware, or may be implemented in a form of a software functional module. It should be noted that in embodiments of this application, the module division is an example, and is merely logical function division, and there may be other division manners during actual implementation.

Figure 14:
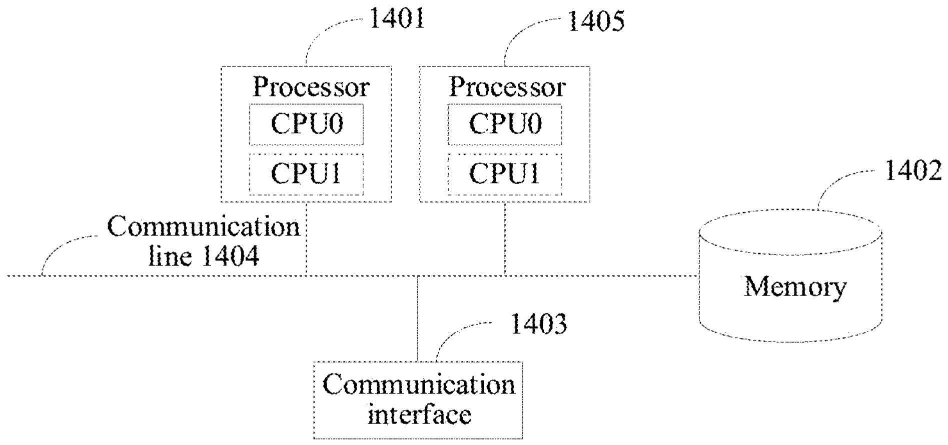
FIG. 14 is a schematic diagram of a hardware structure of another terminal device according to an embodiment of this application.

FIG. 14 is a schematic diagram of a hardware structure of another terminal device according to an embodiment of this application. As shown in FIG. 14, the terminal device may include a processor 1401, a communication line 1404, and at least one communication interface (for example, a communication interface 1403 is used as an example for descriptions in FIG. 14).

The processor 1401 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 1404 may include a circuit configured to transmit information between the foregoing components.

The communication interface 1403 uses any apparatus of a transceiver type to communicate with another device or a communication network such as an Ethernet, wireless local area networks (wireless local area networks, WLAN), and the like.

Possibly, the terminal device may further include a memory 1402.

The memory 1402 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM) or a compact disc read-only memory (compact disc read-only memory, CD-ROM) or another compact disc storage, optical disc storage (including compressed optical discs, laser discs, optical discs, digital versatile optical discs, and Blu-ray discs), magnetic disk storage media, or another magnetic storage device, or any another medium that can be used to carry or store desired program code in the form of an instruction or a data structure and that can be accessed by a computer, but not limited thereto. The memory may exist independently, and is connected to the processor via the communication line 1404. The memory may alternatively be integrated with the processor.

The memory 1402 is configured to store computer-executable instructions for executing the solutions in this application under control of the processor 1401. The processor 1401 is configured to execute the computer-executable instructions stored in the memory 1402, to implement the application clone-based interface display method provided in embodiments of this application.

Possibly, the computer-executable instructions in embodiments of this application may also be referred to as application code. This is not specifically limited in embodiments of this application.

During specific implementation, in an embodiment, the processor 1401 may include one or more CPUs, for example, a CPU0 and a CPU1 in FIG. 14.

During specific implementation, in an embodiment, the terminal device may include a plurality of processors, such as a processor 1401 and a processor 1405 in FIG. 14. Each of these processors may be a single-core (single-CPU) processor, or may be a multi-core (multi-CPU) processor. The processor herein may be one or more devices or circuits, and/or a processing core configured to process data (for example, computer program instructions).

Figure 15:
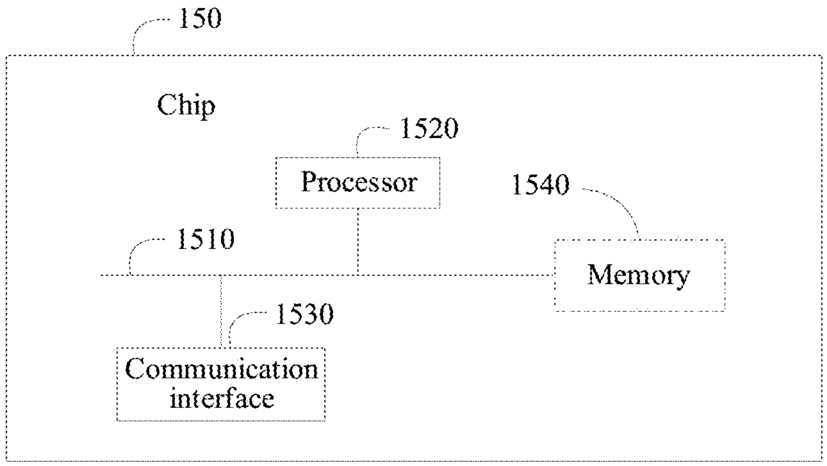
FIG. 15 is a schematic diagram of a structure of a chip according to an embodiment of this application.

FIG. 15 is a schematic diagram of a structure of a chip according to an embodiment of this application. A chip 150 includes one or at least two (including two) processors 151, a communication line 152, a communication interface 153, and a memory 154.

In some implementations, the memory 154 stores the following elements: an executable module or a data structure, or subsets thereof, or extended sets thereof.

The method described in embodiments of this application may be applied to the processor 151 or implemented by the processor 151. The processor 151 may be an integrated circuit chip having a capability of processing a signal. In an implementation process, steps in the foregoing methods can be implemented by using a hardware integrated logical circuit in the processor 151, or by using instructions in a form of software. The foregoing processor 151 may be a general-purpose processor (for example, a microprocessor or a conventional processor), a digital signal processing (digital signal processing, DSP), an application-specific integrated circuit (application-specific integrated circuit, ASIC), a field-programmable gate array (field-programmable gate array, FPGA), or another programmable logic device, a discrete gate, a transistor logic device, or a discrete hardware component. The processor 151 may implement or execute various processing-related methods, steps, and logical block diagrams disclosed in embodiments of this application.

The steps of the methods disclosed with reference to embodiments of this application may be directly performed and completed by using a hardware decoding processor, or may be performed and completed by using a combination of hardware and software modules in the decoding processor. The software module may be located in a mature storage medium in the field such as a random access memory, a read-only memory, a programmable read-only memory, or an electrically erasable programmable memory (electrically erasable programmable read only memory, EEPROM). The storage medium is located in the memory 154, and the processor 151 reads information in the memory 154, and completes the steps in the foregoing methods in combination with hardware thereof.

The processor 151, the memory 154, and the communication interface 153 may communicate with each other via the communication line 152.

In the foregoing embodiment, the instructions executed by the processor stored in the memory may be implemented in the form of a computer program product. The computer program product may be pre-written in the memory, or may be downloaded and installed in the memory in the form of software.

Embodiments of this application further provide a computer program product, including one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, including one or more usable media. For example, the usable medium may include a magnetic medium (for example, a floppy disk, a hard disk, or a magnetic tape), an optical medium (for example, a digital versatile disc (digital versatile disc, DVD)), a semi-conductive medium (for example, a solid state disk (solid state disk, SSD)), or the like.

An embodiment of this application further provides a computer-readable storage medium. All or some of methods in the foregoing embodiments may be implemented by using software, hardware, firmware, or any combination thereof. The computer-readable medium may include a computer storage medium and a communication medium, and may further include any medium that can transmit a computer program from one place to another. The storage medium may be any target medium accessible by a computer.

In a possible design, the computer-readable storage medium may include a compact disc read-only memory (compact disc read-only memory, CD-ROM), a RAM, a ROM, an EEPROM, or another optical disc memory. The computer-readable medium may include a magnetic disk memory or another magnetic disk storage device. Any connection line may also be appropriately referred to as a computer readable medium. For example, if software is transmitted from a website, a server or another remote source by using a coaxial cable, an optical fiber cable, a twisted pair, a DSL or wireless technologies (such as infrared ray, radio, and microwave), the coaxial cable, optical fiber cable, twisted pair, DSL or wireless technologies such as infrared ray, radio, and microwave are included in the definition of the medium. A magnetic disk and an optical disc used herein include a compact disc (CD), a laser disc, an optical disc, a digital versatile disc (digital versatile disc, DVD), a floppy disk, and a blue ray disc. The magnetic disk generally reproduces data in a magnetic manner, and the optical disc reproduces data optically by using laser.

Embodiments of this application are described with reference to the flowcharts and/or block diagrams of the method, the device (system), and the computer program product according to embodiments of this application. It should be understood that computer program instructions can implement each procedure and/or block in the flowcharts and/or block diagrams and a combination of procedures and/or blocks in the flowcharts and/or block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

The invention claimed is:

1. An application clone-based interface display method, wherein the method comprises:
- displaying, by a terminal device, a first interface at a first moment, wherein the first interface comprises first content of a first application clone, an icon of a second application, and an icon of a second application clone;
- receiving, by the terminal device, a first operation for the icon of the second application clone;
- displaying, by the terminal device, a second interface based on the first operation, wherein the second interface comprises a first control, and the second interface is an interface of the second application clone;
- receiving, by the terminal device, a second operation for the first control at a second moment; and
- displaying, by the terminal device, a third interface in response to the second operation, wherein the third interface is an interface of the first application clone, the second moment is later than the first moment, and a time interval between the second moment and the first moment is less than or equal to first preset duration.

2. The method according to claim 1, wherein the displaying, by the terminal device, a third interface in response to the second operation comprises:
- determining, by the terminal device in response to the second operation, whether the time interval between the second moment and the first moment is less than or equal to the first preset duration; and
- displaying, by the terminal device, the third interface when the terminal device determines that the time interval between the second moment and the first moment is less than or equal to the first preset duration.

3. The method according to claim 2, wherein when the terminal device displays the second interface, the method further comprises:
- generating, by the terminal device, a first record of jumping from the first application clone to the second application clone, wherein effective duration of the first record is the first preset duration; and
- the determining, by the terminal device, whether the time interval between the second moment and the first moment is less than or equal to the first preset duration comprises:
- determining, by the terminal device, whether the first record is valid, wherein when the first record is valid, the terminal device determines that the time interval between the second moment and the first moment is less than or equal to the first preset duration.

4. The method according to claim 1, wherein the first content of the first application clone is multimedia information; and
- the displaying, by the terminal device, a second interface based on the first operation comprises:
- displaying, by the terminal device, a fourth interface in response to the first operation, wherein the fourth interface comprises an icon of a first chat window;
- receiving, by the terminal device, a third operation for the icon of the first chat window;
- displaying, by the terminal device, a fifth interface in response to the third operation, wherein the fifth interface comprises a control to confirm sharing;
- receiving, by the terminal device, a fourth operation for the control to confirm sharing; and
- sharing, by the terminal device, the multimedia information to the first chat window, and displaying the second interface, in response to the fourth operation, wherein the second interface comprises first prompt information for prompting successful sharing of the multimedia information.

5. The method according to claim 1, wherein the first content of the first application clone is payment information; and
- the displaying, by the terminal device, a second interface based on the first operation comprises:
- sharing, by the terminal device, the payment information to the second application clone, and displaying a sixth interface, in response to the first operation, wherein the sixth interface comprises a payment control;

receiving, by the terminal device, a fifth operation for the payment control; and displaying, by the terminal device, the second interface in response to the fifth operation, wherein the second interface comprises second prompt information for prompting successful payment.

6. The method according to claim 1, wherein the method further comprises:

displaying, by the terminal device, a seventh interface at a third moment, wherein the seventh interface comprises second content of the first application clone, the icon of the second application, and the icon of the second application clone;

receiving, by the terminal device, a sixth operation for the icon of the second application clone;

displaying, by the terminal device, an eighth interface based on the sixth operation, wherein the eighth interface comprises a second control, and the eighth interface is the interface of the second application clone;

receiving, by the terminal device, a seventh operation for the second control at a fourth moment;

displaying, by the terminal device, a ninth interface in response to the seventh operation, wherein the ninth interface comprises an icon of a first application and an icon of the first application clone, the fourth moment is later than the third moment, and a time interval between the fourth moment and the third moment is greater than the first preset duration;

receiving, by the terminal device, an eighth operation for the icon of the first application clone; and displaying, by the terminal device, a tenth interface in response to the eighth operation, wherein the tenth interface is the interface of the first application clone.

7. The method according to claim 6, wherein the displaying, by the terminal device, a ninth interface in response to the seventh operation comprises:

determining, by the terminal device in response to the seventh operation, whether the time interval between the fourth moment and the third moment is greater than the first preset duration; and displaying, by the terminal device, the ninth interface when the terminal device determines that the time interval between the fourth moment and the third moment is greater than the first preset duration.

8. The method according to claim 7, wherein when the terminal device displays the eighth interface, the method further comprises:

generating, by the terminal device, a second record of jumping from the first application clone to the second application clone, wherein effective duration of the second record is the first preset duration; and the determining, by the terminal device, whether the time interval between the fourth moment and the third moment is greater than the first preset duration comprises:

determining, by the terminal device, whether the second record is valid, wherein when the second record is invalid, the terminal device determines that the time interval between the fourth moment and the third moment is greater than the first preset duration.

9. The method according to claim 1, wherein after the third moment, the method further comprises:

displaying, by the terminal device, an eleventh interface at a fifth moment, wherein the eleventh interface comprises third content of the first application clone and the icon of the second application, and a time interval between the fifth moment and the third moment is less than or equal to second preset duration;

receiving, by the terminal device, a ninth operation for the icon of the second application; and displaying, by the terminal device, a twelfth interface in response to the ninth operation, wherein the twelfth interface is the interface of the second application clone.

10. The method according to claim 9, wherein the displaying, by the terminal device, a twelfth interface in response to the ninth operation comprises:

determining, by the terminal device in response to the ninth operation, whether the time interval between the fifth moment and the third moment is less than or equal to the second preset duration; and displaying, by the terminal device, the twelfth interface when the terminal device determines that the time interval between the fifth moment and the third moment is less than or equal to the second preset duration.

11. The method according to claim 10, wherein effective duration of the second record of jumping from the first application clone to the second application clone is the second preset duration; and the determining, by the terminal device, whether the time interval between the fifth moment and the third moment is less than or equal to the second preset duration comprises:

determining, by the terminal device, whether the second record is valid, wherein when the second record is valid, the terminal device determines that the time interval between fifth moment and the third moment is less than or equal to the second preset duration.

12. The method according to claim 1, wherein after the third moment, the method further comprises:

displaying, by the terminal device, a thirteenth interface at a sixth moment, wherein the thirteenth interface comprises fourth content of the first application clone and the icon of the second application, and a time interval between the sixth moment and the third moment is greater than second preset duration;

receiving, by the terminal device, a tenth operation for the icon of the second application clone; and displaying, by the terminal device, a fourteenth interface in response to the tenth operation, wherein the fourteenth interface comprises the fourth content of the first application clone, the icon of the second application, and the icon of the second application clone.

13. The method according to claim 12, wherein the displaying, by the terminal device, a fourteenth interface in response to the tenth operation comprises:

determining, by the terminal device in response to the tenth operation, whether a time interval between the sixth moment and the third moment is greater than the second preset duration; and displaying, by the terminal device, the fourteenth interface when the terminal device determines that the time interval between the sixth moment and the third moment is greater than the second preset duration.

14. The method according to claim 13, wherein effective duration of the second record of jumping from the first application clone to the second application clone is the second preset duration; and the determining, by the terminal device, whether the time interval between the sixth moment and the third moment is greater than the second preset duration comprises:

determining, by the terminal device, whether the second record is valid, wherein when the second record is invalid, the terminal device determines that the time interval between the sixth moment and the third moment is greater than the second preset duration.

15. An electronic device, comprising:

one or more processors;

one or more memories; and a module at which a plurality of applications are installed, wherein the memory stores one or more programs, and when the one or more programs are executed by the processor, the electronic device is enabled to perform the following steps:

displaying, by a terminal device, a first interface at a first moment, wherein the first interface comprises first content of a first application clone, an icon of a second application, and an icon of a second application clone;

receiving, by the terminal device, a first operation for the icon of the second application clone;

displaying, by the terminal device, a second interface based on the first operation, wherein the second interface comprises a first control, and the second interface is an interface of the second application clone;

receiving, by the terminal device, a second operation for the first control at a second moment; and displaying, by the terminal device, a third interface in response to the second operation, wherein the third interface is an interface of the first application clone, the second moment is later than the first moment, and a time interval between the second moment and the first moment is less than or equal to first preset duration.

16. A computer storage medium, comprising a computer program, which when executed by a processor, cause the processor to perform operations comprising:

displaying, by a terminal device, a first interface at a first moment, wherein the first interface comprises first content of a first application clone, an icon of a second application, and an icon of a second application clone;

receiving, by the terminal device, a first operation for the icon of the second application clone;

displaying, by the terminal device, a second interface based on the first operation, wherein the second interface comprises a first control, and the second interface is an interface of the second application clone;

receiving, by the terminal device, a second operation for the first control at a second moment; and displaying, by the terminal device, a third interface in response to the second operation, wherein the third interface is an interface of the first application clone, the second moment is later than the first moment, and a time interval between the second moment and the first moment is less than or equal to first preset duration.

* * * * *